United States Patent [19]
Oprescu et al.

[11] Patent Number: 5,559,967
[45] Date of Patent: Sep. 24, 1996

[54] METHOD AND APPARATUS FOR A DYNAMIC, MULTI-SPEED BUS ARCHITECTURE IN WHICH AN EXCHANGE OF SPEED MESSAGES OCCURS INDEPENDENT OF THE DATA SIGNAL TRANSFERS

[75] Inventors: Florin Oprescu, Sunnyvale; Roger Van Brunt, San Francisco, both of Calif.

[73] Assignee: Apple Computer, Inc., Cupertino, Calif.

[21] Appl. No.: 33,119

[22] Filed: Mar. 18, 1993

[51] Int. Cl.⁶ .................................................. G06F 13/00
[52] U.S. Cl. ........................ 395/285; 395/306; 395/849; 364/DIG. 1; 364/240; 364/240.8
[58] Field of Search ..................................... 395/325, 275, 395/500, 550, 285, 286, 306, 849; 370/85.1, 84

[56] References Cited

U.S. PATENT DOCUMENTS

| | | | |
|---|---|---|---|
| 3,980,993 | 9/1976 | Bredart et al. | 395/325 |
| 4,156,798 | 5/1979 | Doelz | 179/15 AL |
| 4,229,815 | 10/1980 | Cummiskey | 370/84 |
| 4,307,265 | 12/1981 | Hagen et al. | 178/3 |
| 4,476,527 | 10/1984 | Clayton, IV | 395/849 |
| 4,488,226 | 12/1984 | Wagner, Jr. et al. | 395/849 |
| 4,607,345 | 8/1986 | Mehta | 395/250 |
| 4,663,766 | 5/1987 | Bremer | 375/13 |
| 4,771,391 | 9/1988 | Blasbalg | 395/200 |
| 4,856,023 | 8/1989 | Singh | 375/3 |
| 5,023,869 | 6/1991 | Grover et al. | 370/84 |
| 5,103,446 | 4/1992 | Fischer | 370/85.1 |
| 5,208,809 | 5/1993 | Fergeson et al. | 370/91 |
| 5,220,211 | 6/1993 | Christopher et al. | 307/443 |
| 5,220,561 | 6/1993 | Nuhn et al. | 370/84 |
| 5,230,071 | 7/1993 | Newman | 395/550 |
| 5,263,172 | 11/1983 | Olnowich | 395/800 |
| 5,280,587 | 1/1994 | Shimodaira et al. | 395/275 |
| 5,289,582 | 2/1994 | Hirata et al. | 395/849 |
| 5,291,588 | 3/1994 | Kohtz et al. | 395/550 |
| 5,327,581 | 7/1994 | Goldberg | 455/51.2 |
| 5,335,337 | 8/1994 | Gagliardo et al. | 395/325 |
| 5,361,399 | 11/1994 | Linquist et al. | 455/56.1 |
| 5,400,329 | 3/1995 | Tokura et al. | 370/84 |
| 5,412,783 | 5/1995 | Skokan | 395/285 |

FOREIGN PATENT DOCUMENTS

| | | | |
|---|---|---|---|
| 0444779 | 9/1991 | European Pat. Off. | G06F 13/40 |
| 0453199 | 10/1991 | European Pat. Off. | G06F 13/42 |
| 0522244 | 1/1993 | European Pat. Off. | H04L 12/40 |

*Primary Examiner*—Ayaz R. Sheikh
*Attorney, Agent, or Firm*—Blakely, Sokoloff, Taylor & Zafman

[57] ABSTRACT

In a computer bus arrangement in which a plurality of nodes are interconnected by communication links, control signals are exchanged between the nodes concerning the transmission rate of a data message to be transmitted and the reception rate capability of the nodes. The data message is passed to those nodes which have a reception rate capability which matches or exceeds the transmission rate associated with the message. The other nodes receive a mock data message at a rate within their capability. In order to aid in synchronization within the bus arrangement, the duration of the mock data message is the same as the data message received by the other nodes, even though they are transmitted at different rates.

13 Claims, 25 Drawing Sheets

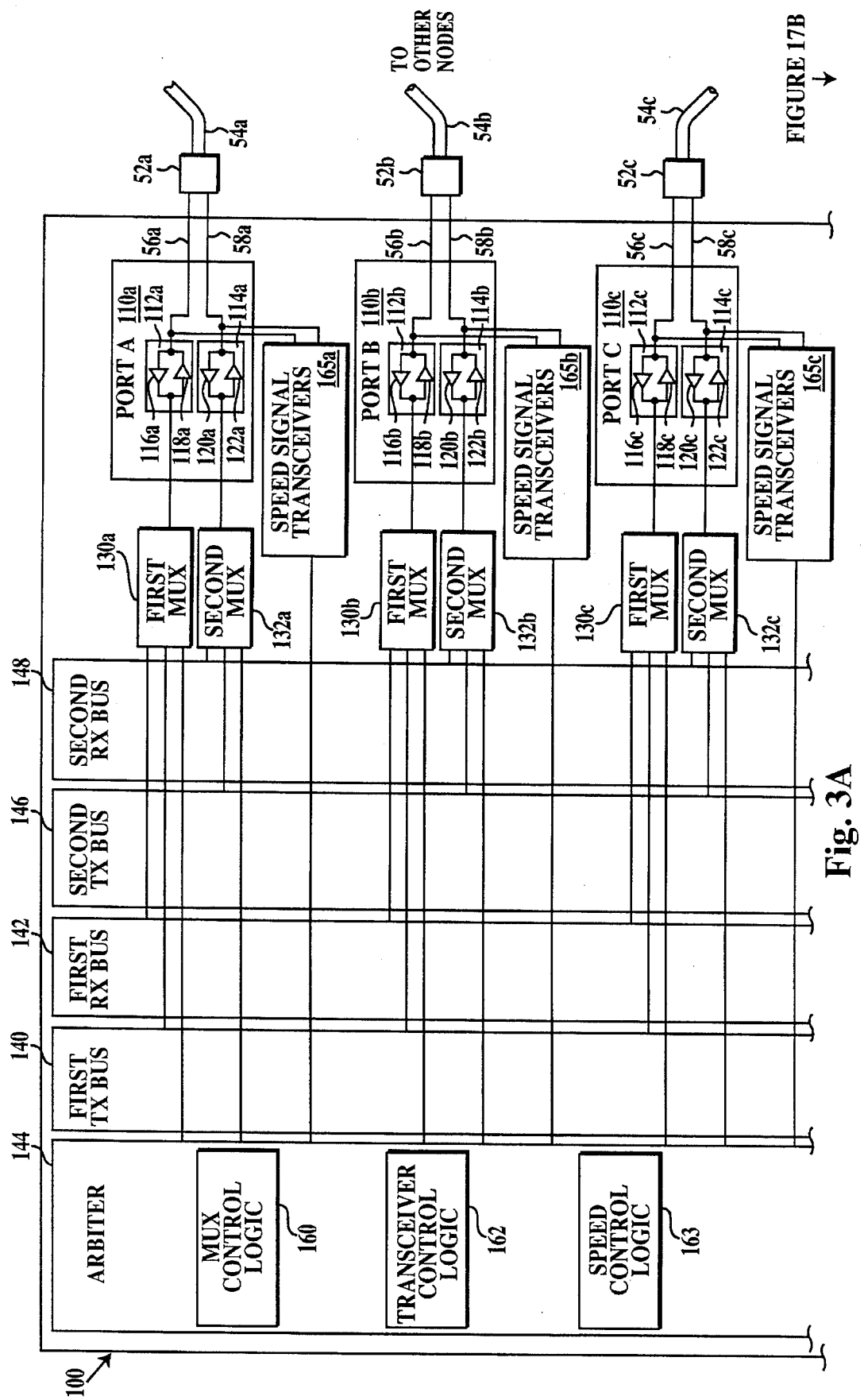

METHOD AND APPARATUS FOR A DYNAMIC, MULTI-SPEED BUS ARCHITECTURE IN WHICH AN EXCHANGE OF SPEED MESSAGES OCCURS INDEPENDENT OF THE DATA SIGNAL TRANSFERS

BACKGROUND OF THE INVENTION

1. Field of the Invention

The present invention relates to a bus architecture communications scheme for enabling communications between a plurality devices or nodes coupled together in a computer system, and more particularly, to a dynamic, multi-speed bus architecture for enabling multi-speed data transfers on a bus having variable speed and fixed speed nodes connected thereto.

Computer devices or nodes within a given computer system, such as a microprocessor, a disk drive, a CRT, a printer and the like, convey signals between themselves through the use of a bus which normally comprises a plurality of transmission channels and acts as a communications path for interconnecting several nodes in the system. Each node in the system need only plug into the bus to be theoretically connected to each of the other nodes in the system. In this type of bus architecture, a signal which is transmitted on the bus by a particular node is available for reception by all other nodes attached to the bus. However, these bus architectures require that the data transfers be performed at a fixed speed corresponding to the speed of the slowest node so that data signals transmitted on the bus can be received and properly decoded by all nodes coupled to the bus.

In order to overcome this fixed speed requirement, multi-speed bus architectures (both serial and parallel) have been proposed so as to achieve optimum price-performance system implementation and open-ended, upward compatibility. What has resulted from these proposals is a high speed bus architecture which takes advantage of the higher speed capability of the newer nodes coupled to the bus. In such bus architectures, the higher speed nodes transmit data signals at their respective speeds to all nodes irregardless of the speed capability of the receiving nodes. In this way, transmissions between higher speed nodes may be accomplished at faster speeds. However, transmissions between lower speed nodes, or between both higher and lower speed nodes, must occur at a lower speed which is fixed by the slowest node taking part in the transmission. A major problem posed by this type of bus architecture scheme is that in high speed transmissions between higher speed nodes, the lower speed nodes must still be able to detect the beginning and end of the higher speed transmissions so that their timing of the different phases in the protocol for the bus will not be disturbed.

A known solution to this problem is the use of speed messages which are attached to the front end of the data signal transfers and transmitted concurrently therewith. In addition, these "multi-speed busses" also comprise a high speed envelope detector in each of the lower speed nodes coupled to the bus for detecting the length (i.e., the duration) of the data signal transfer. As a data signal is transmitted on the bus, each node decodes the speed message to determine if it can properly receive the transmission. If the node has a lower speed than that of the transmission, this lower speed node cannot decode the transmission, but instead uses the envelope detector to detect the presence and duration of the transmission. This enables the lower speed node to stay in synch with the protocol timing of the bus.

Nonetheless, the use of envelope detectors has its drawbacks; the implementation of the detector circuitry compromises the cost advantage of the lower speed nodes. It also restricts the expandability of the bus in terms of its speed due to the fact that the slowest node coupled to the bus dictates the maximum speed of the data signal transfer on the bus. That is, the bus in all its future implementations cannot transfer data at a speed higher than the maximum working speed of the slowest envelope detector (usually implemented in the earliest nodes). Hence, these so-called "multi-speed busses" are in actuality only high speed busses based on the slowest speed of the slowest node coupled to the bus.

Accordingly, it is an object of the present invention to provide a method and apparatus for the transfer of speed messages on a multi-speed bus independent of the data signal transfers.

Another object of the present invention is to provide a method and apparatus for the exchange of speed messages between adjacent nodes coupled to a multi-speed bus so as to inform the downstream relaying nodes of the transmission speed of a data signal transfer and to inform the transmitting node and all upstream relaying nodes of the speed capability of all the downstream, adjacent nodes.

It is another object of the present invention to provide a multi-speed bus architecture in which higher speed, data signal transfers to lower speed nodes are substituted with low speed, mock signals having the same duration as the data signal transfers so as to enable the use of lower speed nodes which do not require high speed envelope detectors.

A further object of the present invention is to provide a multi-speed bus having upward expandability, wherein the use of present, lower speed nodes in no way limits the capabilities of future high speed nodes and wherein the higher speed signaling mechanism need only be implemented in the higher speed nodes that are going to benefit from it.

Yet another object of the present invention is to provide a method and apparatus for the parallel or concurrent transmission of speed signals or messages with arbitration signals using a common mode signaling technique, which method and apparatus further resolves the problem of a limited common mode voltage range at both the transmitter and receiver ends of the bus.

A still further object of the present invention is to implement the above objects in a multi-speed, serial bus architecture pursuant to the IEEE P1394 standard having an arbitrary bus topology where nodes coupled to the bus need not be arranged in a predefined network topology but can be arbitrarily coupled to other nodes via the serial bus to form an assorted number of network arrangements.

BRIEF SUMMARY OF THE INVENTION

A method for simultaneous transmission of signals on a bus having at least two nodes. The present invention provides a method and apparatus for driving a common node current on each of two lines of a twisted pair. The present invention also includes a method and apparatus for applying a voltage bias to each of the signal lines and then comparing the voltage bias with a first voltage derived from a second coupling of the first and second signal lines. The present invention also includes a method and means for generating a response signal corresponding to the voltage difference between the first voltage and the voltage bias.

The present invention also includes a method and apparatus for transmitting signals on a multi-speed bus that includes detecting the rate of transmission of a first data message. Also included is an apparatus for sending a signal which indicates the rate of transmission of the first data message. The present invention also includes a method and apparatus to send a signal representing the capability of the necessary agent to receive the signal. Then a determination is made as to whether the rate of transmission of the data message exceeds the first rate. If this is the case, then the present invention determines the duration of the data message and sends another signal at the slower rate, wherein the signal has a duration equal to that of the data message.

BRIEF DESCRIPTION OF THE DRAWINGS

The objects, features and advantages of the present invention will become apparent from the following detailed description of the preferred embodiment in which:

FIGS. 3a and 3b is a block diagram of one embodiment of the nodes of the present invention.

DETAILED DESCRIPTION OF THE INVENTION

The present invention relates to a method and apparatus for a dynamic, multi-speed bus architecture in which speed messages are exchanged between adjacent nodes prior to the data signal transfers. In the following description, numerous details are set forth such as voltages, currents, device types, etc., in order to provide a thorough understanding of the present invention. It will be obvious, however, to one skilled in the art that these details are not required to practice the present invention. In other instances, well-known circuits, methods and the like are not set forth in detail in order to avoid unnecessarily obscuring the present invention.

I. INDEPENDENT SPEED MESSAGE TRANSMISSION AND NODE COMPATIBILITY

Figure 1:
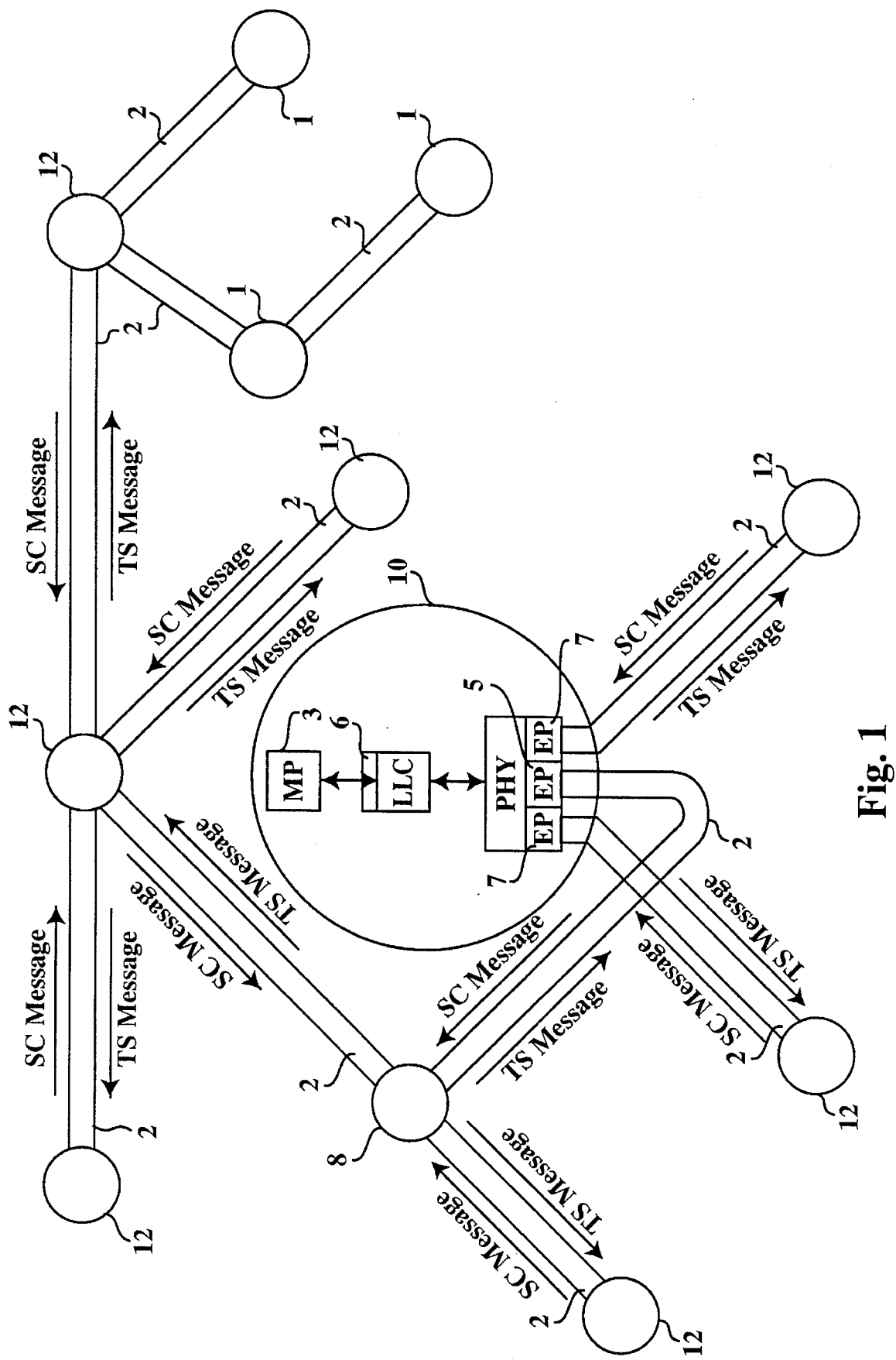
FIG. 1 is a block diagram of a general implementation of the multi-speed bus of the present invention showing the point-to-point interconnections between nodes, the ports of a specific node and an example of the exchange of speed messages between adjacent nodes.

In order to implement a multi-speed bus which has the capacity for upward compatibility with newer nodes having faster transmission speeds, the present invention discloses a bus architecture scheme in which the bus itself comprises a series of devices or nodes which form point-to-point interconnections along the bus. Such a multi-speed bus is shown in FIG. 1. Referring to FIG. 1, each of nodes 1 may include a local host 3, such as a CPU or a microprocessor (MP), and may include a link layer controller (LLC) 6. The local host 3 and LLC 6 receive and transmit messages. Where the node does not include a local host 3 and LLC 6, the node merely performs a repeater function (i.e., only bus functions remain). Thus, the node will not form or receive messages for its own purpose. Each of nodes 1 includes one or more ports, such as ports 5 and 7 shown. Ports 5 and 7 are coupled to and controlled by physical interface PHY. The PHY performs all bus related functions like arbitration, self identification, and bus initialization. The PHY also performs speed signaling and mock signal generation, data and control signal retiming and repeating.

In order to transmit signals between two nodes 1 coupled to the bus, the signals are relayed along separate transmission channels or "links" 2 from one node 1 to another until each and every node 1 has received the signal transfer. Thus, all of the nodes 1 in the system are not coupled to the same physical bus, but instead the nodes 1 are all coupled to the same logical bus. In other words, all of the nodes have to see all of the other nodes in the system. Note that the system of the present invention provides a multi-speed bus which is capable of being expanded upwardly. Each of nodes 1 is capable of operating at a speed different from that of another of nodes 1 in the system. Each of the lower speed nodes in the system does not have to understand the higher speed nodes. In other words, the lower speed nodes do not limit the capabilities of the higher speed nodes, except in the fact that the higher speed nodes cannot perform data transfers between one another at their higher speed when a lower speed node is coupled between them. Because the lower speed nodes are not limited to understanding, the speed signaling mechanism utilized by the higher speed nodes need only be implemented by the higher speed nodes (i.e., the nodes that are going to benefit from it). In this manner, the present invention provides a multi-speed bus which may be expanded to includes future node technologies with increased speed and performance.

In order to facilitate the multi-bus system having nodes which operate at different speeds (e.g., 100 Mbits/s, 200 Mbits/sec, 400 Mbits/sec, etc.), each node must be able to perform a repeating function and a retiming function. That is, each node can simultaneously repeat or retransmit the received signal transfer to a plurality of other adjacent (i.e., directly connected) nodes 1 through outlets referred to as a "ports" 5 and 7 (as long as those ports 5 and 7 are connected to other nodes 1). Note that in the present invention, this repeat function is performed by the PHY. The PHY also performs the retiming of the data to compensate for errors due to channel distortion. It should be noted that access to ports 5 and 7 in each node 1 is controlled by the PHY. Thus, the PHY controls all bus operations for the node. In this manner, it is possible to form an arbitrary bus topology of interconnected nodes 1.

In addition, the present invention further comprises a method for the exchange of speed messages between adjacent nodes 1 to inform adjacent nodes 1 of the transmission speed of a data signal and the speed capability of all "downstream" adjacent nodes 1, wherein the speed messages are transmitted prior to the data signal transfers and together with the bus control signals in the bus arbitration phase. That is, the bus of the present invention has two fundamental phases, an arbitration phase and a data transmission phase. Because the nodes access a shared media (i.e., the logical bus), during one phase all of the nodes arbitrate for ownership of the shared media and then during a subsequent phase the winner of the arbitration contest transmits data during the data transmission phase which all the nodes recognize as the end of the arbitration phase. The speed signaling phase of the present invention occurs during the arbitration phase. In one embodiment, the arbitration phase comprises a bus idle state which all of the nodes recognize as the beginning of the arbitration phase, an arbitration contest where the ownership of the shared media is negotiated, and a data header portion of the arbitration phase. The speed signaling occurs during the last portion of the arbitration phase during the data header portion. In the present invention, this is implemented using differential transmission as a common mode message (i.e., the speed signal) to both lines of the differential transmitter. Note that this is described in more detail later. Note also that by using the differential combination system, the newer nodes which are added to the system need only include additional receiver hardware to extract the common mode message from the differential transmission in order to receive the speed message. The older nodes do not require any additional hardware because the effect of the common mode message on the differential transmission is canceled out since the speed message is added to both differential transmission lines. Note also that by using the common mode signal transfer method, an extra time slot, which the older nodes do not recognize, does not have to be added to the bus state.

With reference to FIG. 1, the local host 3 of a transmitting node 8 generates a data signal to be transmitted to an intended receiving node. The transmitting node 8 is a node 1 in the network which has won the current bus arbitration process and will attempt to transmit a data signal in the upcoming data signal transfer phase. The local host 3 of transmitting node 8 determines the transmission rate of the data signal to be propagated along the bus network which is optimal for bus performance. The rest of the nodes 1 coupled to the network which have not won the current bus arbitration process are designated as relaying nodes 10,12. These relaying nodes 10,12 will simply relay the data signal transfer (and other messages including but not limited to data header messages, bus arbitration messages and the bus idle message) to adjacent nodes 1. The relaying nodes 10,12 will also transmit the received data signal transfers to the local host 3 if such a host 3 exists and is operational. In order to enable each of the relaying nodes 10,12 to relay the data signal transfer to adjacent relaying nodes 10,12, each relaying node 10,12 must be informed of the following information prior to the data signal transfer:

(1) The speed of the data signal transfer to be propagated on the bus. This is called the transmission speed message or "TS message". This TS message precedes each data transfer and is transmitted by the transmitting node 8 and relayed by each (upstream) relaying node 10 to all adjacent (downstream) relaying nodes 12. The TS message is transmitted by a relaying node 10,12 through all but one of its external ports 7 otherwise known as "destination ports". The port through which the TS message is not transmitted is the port through which the TS message is received and is otherwise known as the "source port" 5.

(2) The speed capability of the (downstream) adjacent, relaying nodes 12 which will subsequently receive the data signal transfer that is relayed by the (upstream) relaying node 10 or transmitted by the transmitting node 8. This is called the speed capability message or "SC message". The SC message is transmitted by a (downstream) node 12 through its single source port 5 in the opposite direction of the expected data signal transfer (i.e., upstream) before every data transfer. In an alternative implementation, the SC message can be transmitted by all nodes 1 through all external ports 5,7 after a bus initialization process. In this case, all nodes would indicate their capability which would be stored by the nodes which are coupled to it so that the speed signaling phase may be completed earlier in the bus transfer process.

In addition, because the transmitting node 8 is the first node to actually generate the data signal transfer on the bus, the transmitting node 8 must also receive an SC message from each adjacent device (i.e., through each of its external ports 5,7).

Hence, the transmitting node 8 will transmit a TS message to all downstream, relaying nodes 12 connected to the network so as to inform all relaying nodes 10,12 of the speed at which the data signal transfer will be propagated oil the bus. (Please note that the numbers designating the upstream and downstream relaying nodes 10,12 in the figures cannot encompass all situations such as when an upstream relaying node 10 is actually downstream of the transmitting node 8 and a downstream relaying node 12 is actually upstream of another downstream relaying node 12). In addition, either before, after or concurrently with the reception of the TS message by a relaying node 10,12, that node will transmit its speed capability in the opposite direction to an upstream, relaying node 10 or the transmitting node 8. Via this message exchange, all upstream nodes 10, including the transmitting node 8, will know whether or not the downstream, adjacent nodes 12 have the capability for properly receiving and decoding the particular data signal transfer to be propagated on the bus.

If the data signal transfer on the bus is at a superior speed than the speed capability of a downstream, relaying node 12, the upstream, adjacent relaying node 10 will transmit a mock data signal (i.e., a "data header" message) as a low speed, substitute, differential data signal to the downstream, adjacent relaying node 12 at the same time it receives and retransmits the actual data signal to all other capable, downstream, adjacent nodes 12.

Figure 2:
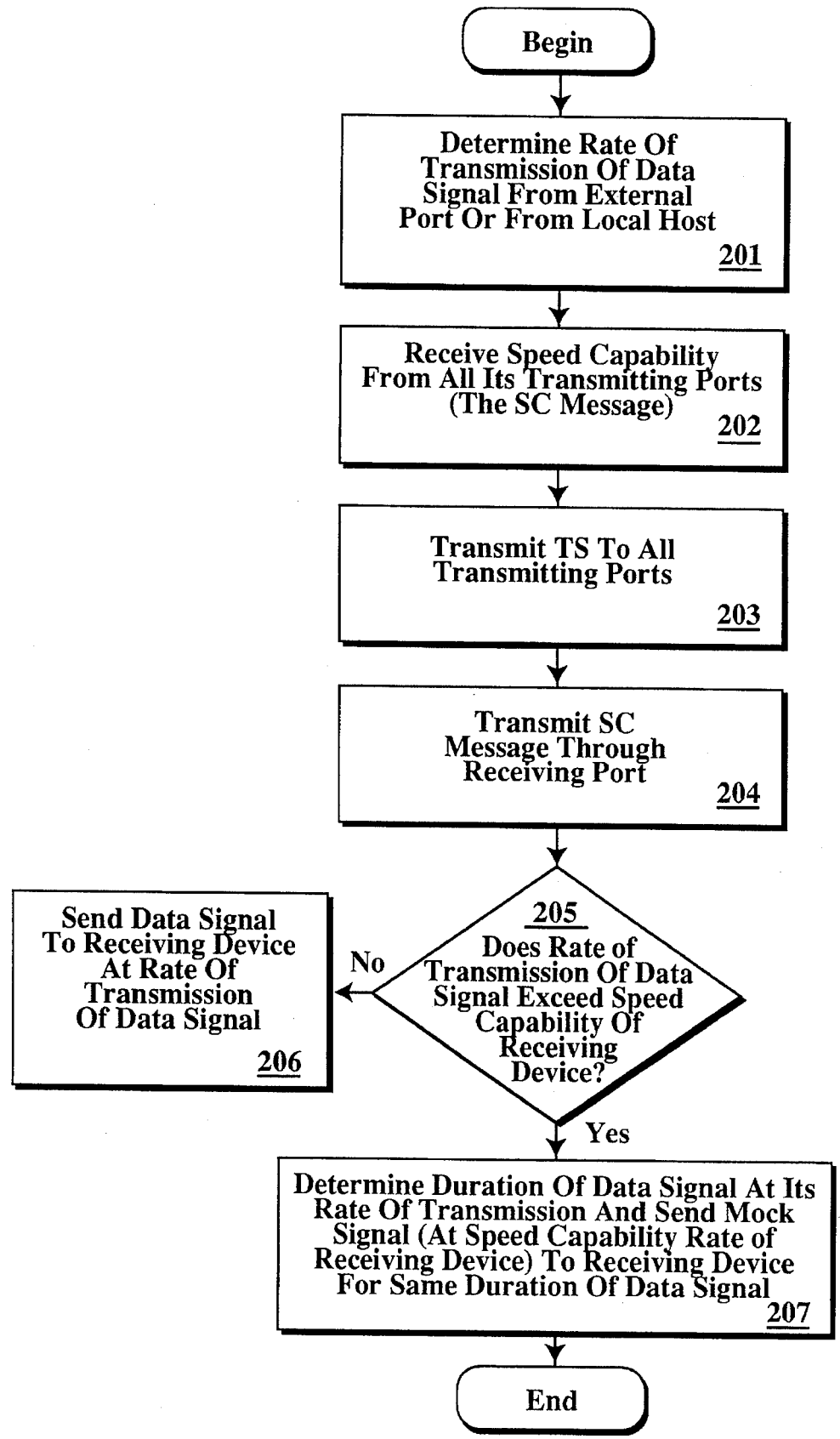
FIG. 2 is a flow chart of one embodiment of the method for exchanging speed messages.

Henceforth, one embodiment of the method for exchanging speed messages between adjacent nodes is set forth in a flow chart in FIG. 2. FIG. 2 represents the speed selection algorithm used for each port of each node. The node receives the TS message from another device (i.e., node) through an external port (other than the one in question—a port does not implement this algorithm when it is a receiving port) or from the local host. The node receives the SC message through the port in question. The node then compares the two and decides to relay the incoming data through the port in question or replace it with the mock signal.

Referring to FIG. 2, the method begins by determining the rate of transmission of the data signal (processing block 201). In the currently preferred embodiment, this is accomplished by receiving the TS message. The speed capability of the connected node is ascertained from a first control signal if the port is a transmitting port (processing block 202). In the currently preferred embodiment, the speed capability is ascertained by receiving an SC message. Next, a second control signal is sent to the connected device if the connected device is a receiving device (i.e., the current port is a transmitting port), therein indicating the speed of the incoming signal (processing block 203). Then the speed capability of the node is transmitted by a control signal (processing block 204). In one embodiment, this control signal is an SC message. Upon receipt of the message (i.e., processing block 202), the transmitting device tests whether the rate of transmission of the data signal exceeds the speed capability of the receiving device (processing block 205). If the rate of transmission of the data signal does not exceed the speed capability of the receiving device, then the data signal is sent to the receiving device at the rate of transmission of the data signal (processing block 206). On the other hand, if the rate of transmission of the data signal exceeds the speed capability of the receiving device, then the duration of the data signal at its rate of transmission is determined and a mock signal is sent to the receiving device at the speed capability of the receiving device for the same duration as the data signal (processing block 207).

Figure 3B:
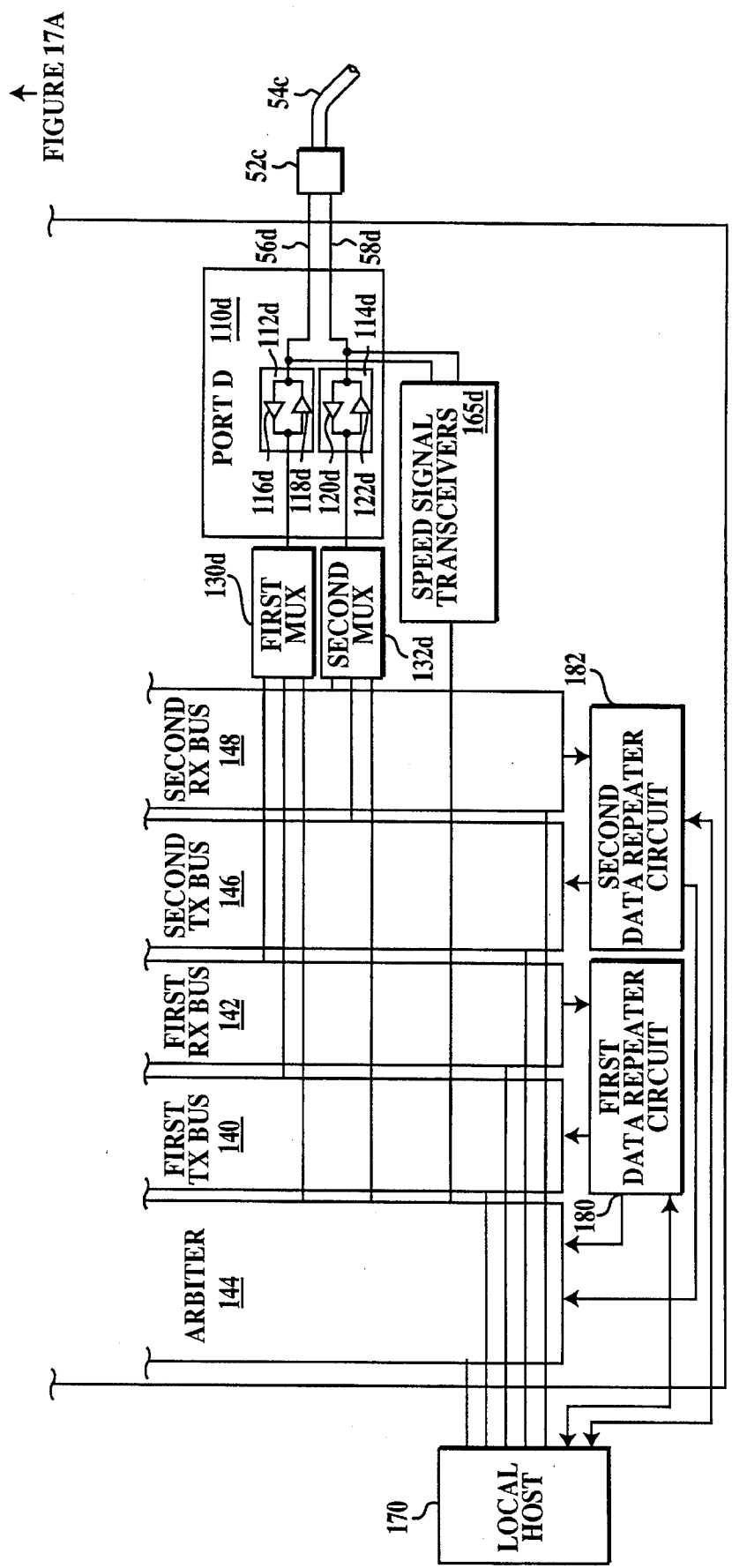

The generation and sending of the mock signal is accomplished by the nodes themselves. In one embodiment, the generation of the mock signal is performed by the PHY of a node. Reference is made to FIGS. 3a and 3b which is a diagram of the PHY of a parallel node 100 that allows bi-directional, parallel transmission and reception of signals using connectors constructed in accordance with the IEEE 1394 standard. A plurality of sockets 52a–d connect to external nodes. Each socket 52 is constructed in accordance with the IEEE 1394 standard, and therefore has two pairs of differential signal lines and one pair of power lines and supplies a first signal on the first signal line 56 and a second signal on a second signal line 58, which are supplied to a parallel port 110. Each port 110 in the parallel node 100 includes a first two-way transceiver 112 coupled to the first signal line 56 and a second two-way transceiver 114 coupled to the second signal line 58. The first two-way transceiver 112 includes a first receiver 116 and a first transmitter 118. The second two-way transceiver 114 includes a second receiver 120 and a second transmitter 122. The first transceiver 112 is connected to a first multiplexer 130, and the second transceiver 114 is coupled to a second multiplexer 132.

The first multiplexer 130 is coupled to select one of a first transmit bus (TXBUS) 140, a first receive bus (RXBUS) 142, and an arbiter 144. The second multiplexer 132 is coupled to select one of a second transmit bus (TXBUS) 146, a second receive bus (RXBUS) 148, and the arbiter 144. Thus, two sets of transmit and receive buses are provided for parallel data transfer. Specifically, a first set includes the first transmit bus 140 and the first receive bus 142, and the second set includes the second transmit bus 146 and the second receive bus 148. The first multiplexer 130 couples the first transceiver 112 with either the arbiter 144, the transmit bus 140 from the first set, or the receive bus 142 from the first set. Similarly, the second multiplexer 132 can be selected to couple the second transceiver 114 with either the arbiter 144, the second transmit bus 146, or the second receive bus 148.

The arbiter 144 includes control logic responsive to signals received through the parallel ports 110 during arbitration to determine which one port 110 will be used to receive data during the data transfer phase to follow. Preferably, the arbiter 144 is constructed to perform arbitration in accordance with principles described in the following patent and patent applications which are incorporated by reference herein: U.S. Pat. No. 5,394,556, entitled "*Method and Apparatus for Unique Address Assignment, Node Self-Identification and Topology Mapping for a Directed Acyclic Graph*", Ser. No. 07/994,983, entitled "*Method and Apparatus for Arbitrating on an Acyclic Directed Graph*", Ser. No. 07/994,117, entitled "*Method and Apparatus for Arbitrating on an Acyclic Topology Collection of Nodes into an Acyclic Directed Graph*", each of which is assigned to the assignee of the present invention.

The arbiter 144 also is coupled to the first and second multiplexers 130,132, to control the selection made by each of the multiplexers, using MUX control logic 160 provided therein. Additionally, the arbiter 144 is coupled to each transceiver 112, 114, and includes transceiver control logic 162 to control the direction of data flow through each of the transceivers 112, 114. For example, both the first and second transceivers 112a, 114a in port 110a may be controlled to receive data, or both transceivers 112a, 114a may be controlled to transmit data, or the first transceiver 112a can be controlled to receive data and the second transceiver 114a can be controlled to transmit, in accordance with predetermined protocols.

During arbitration, the parallel node 110 of FIG. 3 can operate by selecting the arbiter 144 in the first and second multiplexers 130, 132, and controlling the first transceiver 112 to receive and the second transceiver 114 to transmit. However, preferably the ports 110 include additional control circuitry for bi-directional message flow through both transceivers 112 and 114.

A local host 170, which can be any of the devices illustrated in FIG. 1, is coupled to the first and second receive buses 142,148, the first and second transmit buses 140,146, and the arbiter 144. In a most general application, the local host 94 could be coupled to the buses 140,142, 146,148 and the arbiter 144 like any other external node. However, that arrangement is unnecessary for most hosts, because they will likely already include circuitry, or can be designed with circuitry to interface directly with the arbiter 144 and the buses 140,142,146,148.

The local host 170 may provide a signal to the arbiter 144 to indicate whether or not the local host 170 requests use of the bus. Depending upon the results of the arbitration, the parallel node 110 will either be configured as a transmitter if the local host 170 won the arbitration, or as a repeater if another local host won. If the local host 170 won, then MUX control logic 160 will select the first transmit bus 140 in the first multiplexer and the second transmit bus 146 in second multiplexer 132, and the transceiver control logic 162 will control the first and second transceivers 112, 114 to transmit. The local host 170 will supply its data to the first and second receive buses 142, 148, and it will be transmitted from each of the parallel ports 110. Thus, during data transfer, the arbiter 144 in the parallel node 100 controls each port 110 to receive or transmit data in parallel. This configuration will continue until the next arbitration phase.

However, if local host 170 did not win, then the parallel node 100 will be configured as a repeater, receiving data in parallel on one of the ports 110, and transmitting it on all others (assuming that the external node is capable of receiving the data). In the repeater configuration, the transceiver control logic 162 in the arbiter 144 controls the first and second transceivers 112, 144 in the receiving port 110, for example port 110a, to receive data. Furthermore, the MUX control logic 160 controls the first and second multiplexers 130, 132 in the receiving port 110a to connect to the first receive bus 142, and the second receive bus 148, respectively. The remaining ports 110 are all transmitting ports, therefore, the transceiver control logic 162 controls the transceivers 112, 114 in the transmitting ports 110 to transmit data, and the MUX control logic 160 selects the transmit buses 140, 146 in the first multiplexer 130 and the second multiplexer 132.

A first repeater circuit 180 couples the first receive bus 142 with the first transmit bus 140. Likewise, a second repeater circuit 182 couples the second receive bus 148 with the second transmit bus 146. The first and second data repeater circuits 180, 182 may include any conventional data repeater circuit, such as an amplifier, a resynchronizer or a data regenerator. The first and second repeater circuits 180, 182 may also include circuits for detecting signals that may be sent during data transfer, such as end of message signals. This information could be provided to the local host 170 or the arbiter 144 to facilitate effective control of communication operations.

Each of ports 110a–110d include speed signal transceivers 165a–165d coupled to each the first signal line 56 and the second signal 58 to receive and transmit the speed signals. In the currently preferred embodiment, these speed signals comprise the SC and TS messages. The speed signal received by logic 165a–165d are sent to speed control logic 163 in arbiter 144. Arbiter 144 includes memory to store temporarily the designations of the ports as receiving ports or transmitting ports. Speed control logic 163 includes memory to store temporarily the SC messages it receives through each port and the TC messages received from the receiving port. At the end of the arbitration phase, the data header is sent out by the arbiter 144 on the transmitting ports. The data header indicates to the nodes connected to the transmitting ports that the arbitration phase has ended and the data transmission phase is to begin. The arbiter 144 determines the routing path of the data. That is, the arbiter 144 determines which port is to be a receiving port and which ports are to be the transmitting ports, such that when the data transmission phase begins the data can be routed from the receiving port to the transmitting ports.

At the end of the arbitration phase, speed control logic 163 performs a comparison between the speed capability of the node coupled to the transmitting port and the speed of the data transfer message. In one embodiment, speed control logic 163 performs this comparison by comparing the data from the SC message received from the node coupled to the transmitting port and the data from the TS message. If speed control logic 163 determines that the speed capability of the node coupled to the transmitting port is less than the speed of the data transfer. In one embodiment, speed control logic 163 compares the SC message from the node coupled to the transmitting port to the TS message if the SC message is greater than the TS message, the speed control logic 163 routes the data from its receive port (or from the local host where the node won the arbitration contest itself) to the transmitting port to perform the data transfer. However, if the SC message is less than the TS message, the speed control logic 163 prevents the data transfer from being routed to the transmitting port, such that the data header which is already being transmitted by the port continues to be sent. In this manner, the data header acts as the mock signal. The mock signal is asserted for the end of the data transfer, at which time the speed control logic 163 causes the bus to enter the idle state instead of the data transmission state.

By generating and transmitting a low speed, mock signal transfer having the same duration as the corresponding, differential data signal transfer to the other high speed, adjacent nodes, the arbitration mechanism on the bus will not be disturbed. Hence, in contrast with prior art buses which require an envelope detector to time the duration of the data signal transfer, the low speed node receiving the mock signal does not have to detect the presence or duration of a high speed data signal transfer.

II. IMPLEMENTATION OF THE SPEED MESSAGE EXCHANGE IN AN UPWARD-COMPATIBLE BUS ARCHITECTURE SCHEME

In the prior art implementation of speed messaging on a multi-speed bus, predefined speed messages are transmitted concurrently with (and in front of) the data signal transfers. With this type of speed messaging, each and every node 1 coupled to the bus must receive and decode the speed messages despite the speed capability of the particular node 1 receiving the data signal transfer. Thus a low speed node which does not benefit from higher speed, data signal transfers must still be capable of decoding all speed related messages. Furthermore, these messages have to be defined at the initial design phase of the bus which makes any upward compatibility very difficult.

In the present invention, however, a bus architecture scheme is implemented which permits upward compatibility with future, higher speed nodes. This is accomplished by first providing a signaling method for the multi-speed bus in which all control signals, including speed messages, are transmitted on the bus at an arbitrarily set fixed speed such as 100 Megabits/second (Mbps). In addition, all data signals placed on the bus are transmitted at one of the following set speeds (although there is no maximum speed limitation): 100 Mbps, 200 Mbps, 400 Mbps, 800 Mbps, etc. Second, each node 1 coupled to the bus is designed so as to be capable of handling not only its highest speed setting, but also each speed setting implemented on the bus which is lower than the highest speed of the node 1. In this manner, a 200 Mbps node is required to transmit and receive 100 and 200 Mbps data signal transfers. Similarly, a 400 Mbps node is required to transmit and receive data signal transfers of 100, 200 and 400 Mbps.

Clearly, this idea can be extended to newer and higher speed settings which can be implemented on the bus in the future for newer, higher speed nodes since the transmission method of the present invention does not depend upon the implementation of the previous, slower speed settings. In addition, it would be obvious to one skilled in the art that different speed settings may be used for each of the data and control signal transfers. Normally, the lowest speed setting will be defined by the technological capabilities available at the time of the first implementation of a particular bus. Hence, the slowest node in a new generation of nodes will determine the lowest speed setting which will be implemented for the control signal transfers. Accordingly, the data signal transfers will then comprise speed settings of a higher value than the lowest speed setting used for the control signal transfers.

III. SPEED SIGNALING PROCESSES IMPLEMENTED FOR THE PORTS

The following description is of one particular implementation of a data signal transfer phase through the network of nodes 1 comprising the multi-speed bus of the present invention as is shown in the flowcharts depicted in FIGS. 4–12.

Figure 4:
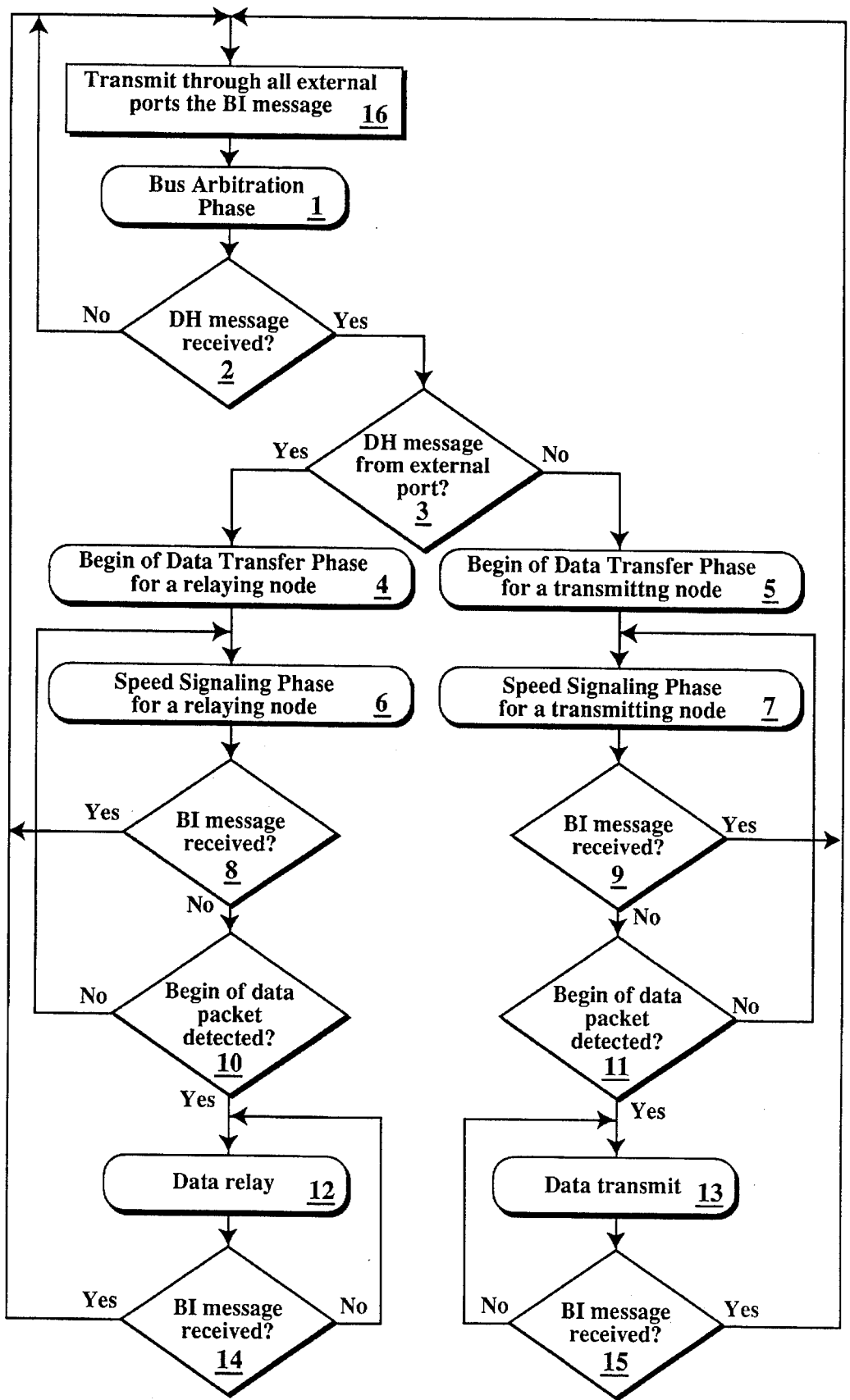
FIGS. 4 is a flowchart showing the general data transfer method of the present invention for a point-to-point interconnected bus.

With reference to FIG. 4, step #1 denotes the start of the Arbitration phase. Prior to each data signal transfer, the nodes that comprise the network negotiate for permission to access the bus. The result is that only one of the nodes connected to the network becomes a transmitting node 1 by receiving permission to transmit a data signal along the bus (although it need not perform a data signal transfer). Such a node designation starts the beginning of the data signal transfer phase by generating a data header (DH) message. This DH message is the message used by all nodes 1 attached to the network to identify the end of the arbitration phase and the beginning of the data signal transfer phase. The transmitting node 8 also assumes the obligation to subsequently restart the arbitration phase by generating a bus idle (BI) message.

In step #2, each node 1 remains in the arbitration phase until the DH message is received. In step #3, a node 1 determines if it is a relaying node 10,12 or a transmitting node 8 by detecting the source of the DH message. The transmitting node 8 recognizes that it is the transmitting node 8 when a DH message is received from an internal controller port. A relaying node 10,12, however, recognizes that it is a relaying node 10,12 when the DH message is received from an external source port.

Figure 5:
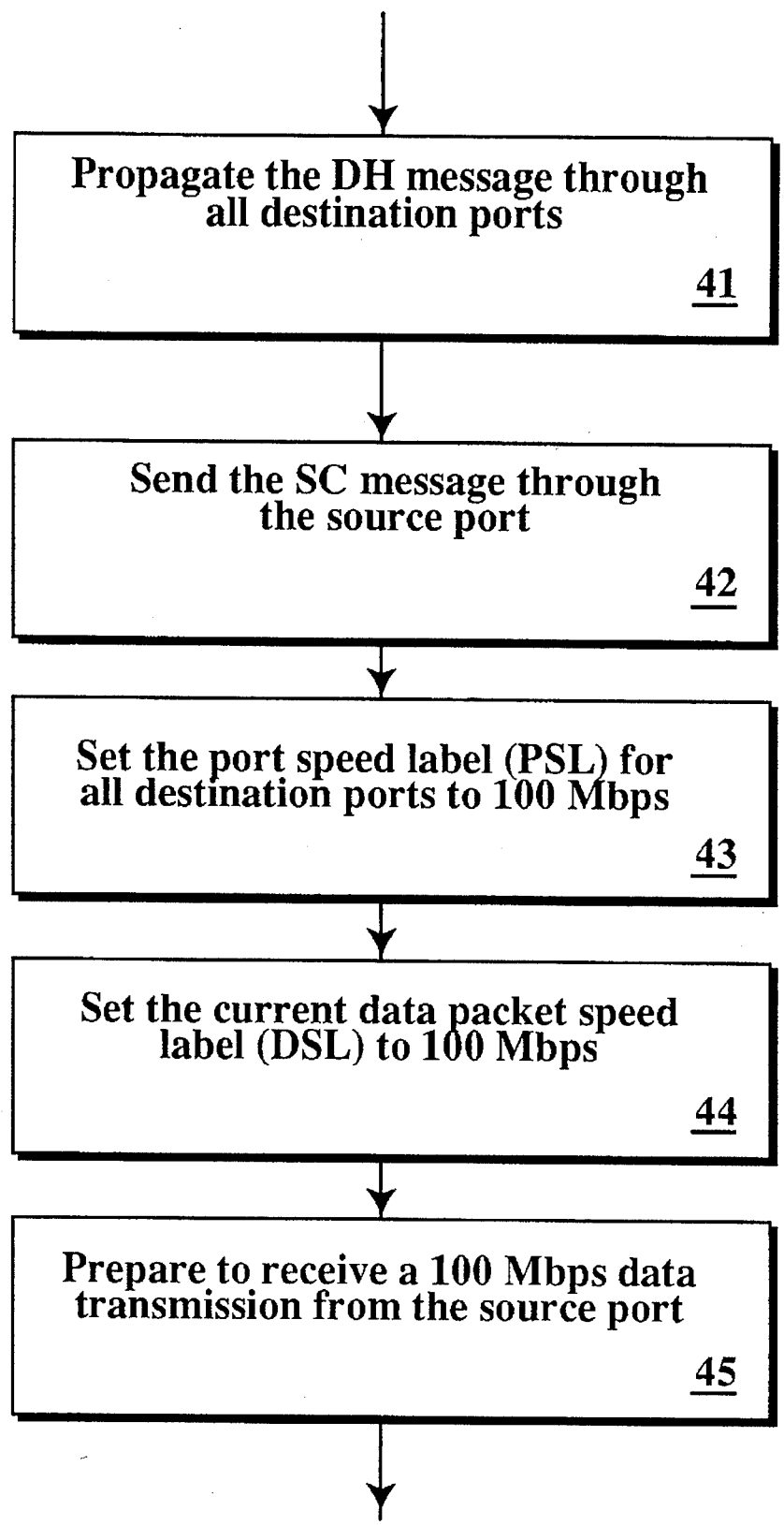
FIGS. 5 and 6 are flowcharts showing the beginning or set-up phase of the data transfer method for a relying node and the transmitting node, respectively.

In steps #4 and #5, the data transfer phase begins for all relaying nodes 10,12 and the transmitting node 8, respectively. In one embodiment, step #4 is further divided into a number of steps in FIG. 5. Referring to FIG. 5, in step #41, a relaying node 10,12 propagates the DH message through all its destination ports 7. In step #42, the relaying node 10,12 transmits through the source port (opposite to the direction of incoming data signal transfer) the SC message describing its speed capability. In step #43, the relaying node 10,12 sets the speed capability of all its destination ports 7 to a default value of the lowest speed setting, i.e., 100 Mbps. This is performed by designating the value of a port speed label (PSL) associated with each external port 5,7 of the relaying node 10,12. The PSL's describes the speed capability of the adjacent node directly connected to that port, and as such, the PSL for a specific port is set for a particular data signal transfer only when that port is connected and it is a destination port 7. In terms of hardware, the value of the PSL for a specific port is set through the use of a memory device such as a register associated with that port of the node.

In step #44, the relaying node 10,12 sets the transmission speed of its source ports to a default value representing the transmission speed of the expected data signal transfer (i.e., the lowest speed setting such as 100 Mbps). This is performed by designating the value of a data speed label (DSL) associated with each node. This DSL designates the transmission speed of the expected data signal transfer pursuant to the TS message. In terms of hardware, the value of the DSL is set through the use of a memory device such as a register which is internal to the node as opposed to being associated with a specific port. In step #45, the relaying node 10,12 prepares its circuits to receive the data signal transfer with respect to the speed defined by the DSL of the node. Similarly, the relaying node 10,12 prepares its circuits to relay the data signal transfer with respect to the speed defined by PSL attached to each of its destination ports 7.

Figure 6:
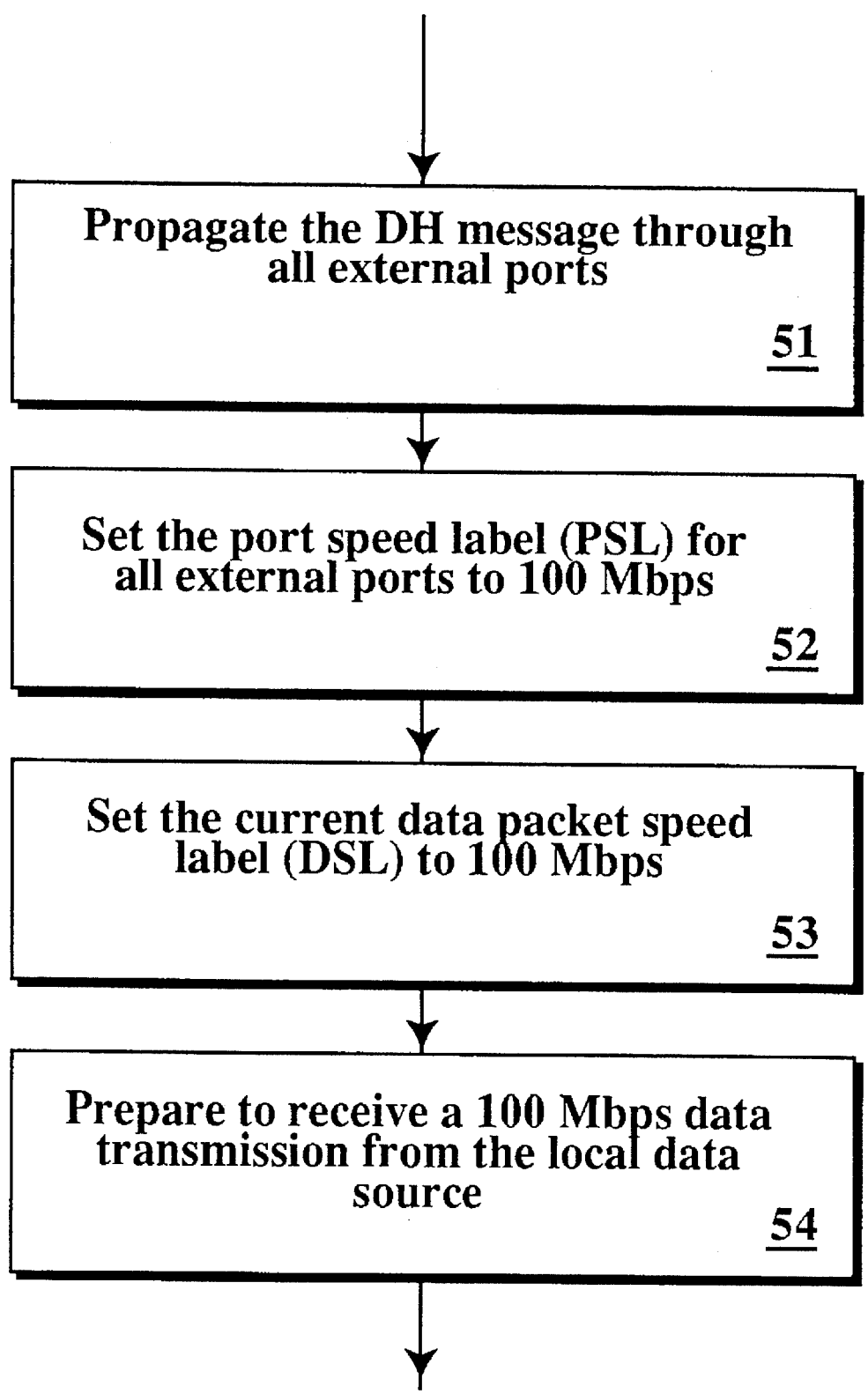

In step #51 of FIG. 6, which is a detailed flowchart of step #5, the transmitting node 8 propagates the DH message through all its destination ports 7, which for a transmitting node comprises each of its external ports. In step #52, the transmitting node 8 sets the speed capability of all its destination ports 7 to the default value through the use of its PSL's. In step #53, the transmitting node then sets the transmission speed of its internal controller port 6 to the default value of 100 Mbps for the expected data signal transfer through the use of the DSL associated with that node. In step #54, the transmitting node 8 prepares its circuits to receive the data signal transfer with the speed defined by its DSL, and it also prepares its circuits to transmit the data signal transfer with the speed defined by the PSL's of its external ports.

In steps #6 and #7 of FIG. 4, the speed messaging method (or speed signaling phase as it may also be called) begins for a relaying node 10,12 and a transmitting node 8, respectively. In step #61 of FIG. 7, which is a detailed flowchart of step #6, the relaying node 10,12 expects to receive a TS message at the beginning of each data signal transfer phase. If a TS message has already been processed during the current data signal transfer phase, the TS message processing sequence is skipped and the SC message processing sequence is begun. In step #62, if a TS message has not been processed yet during the current data signal transfer phase, the relaying node 10,12 checks whether such a message has been received. If not, it continues with the SC message processing sequence. In step #63, if the relaying node 10,12 has received a TS message from its source port 5 and this message has not yet been processed, then the DSL is changed to the value of the received TS message. In step #64, the relaying node 10,12 generates and transmits a TS message through all destination ports 7 independent of the individual PSL's for those ports. It then continues with the SC message processing sequence. In step #65, if the SC message has been received, the relaying node 10,12 then processes it. In step #66, the PSL of the port through which the SC message has been received is set to the value of the SC message.

Figure 7:
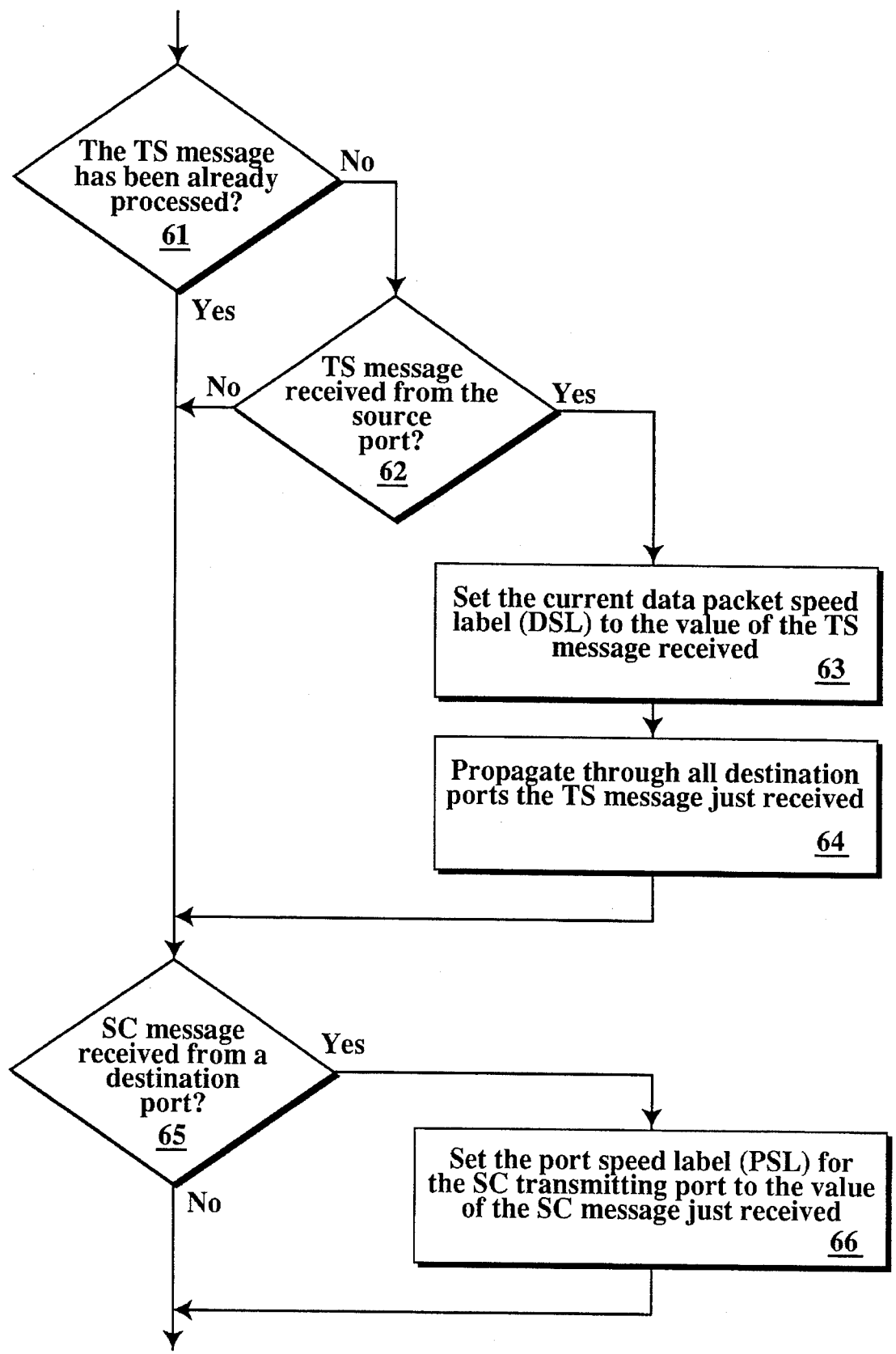
FIGS. 7 and 8 are flowcharts showing the speed messaging method (otherwise known as the speed signaling phase) for a relaying node and the transmitting node, respectively.
Figure 11:
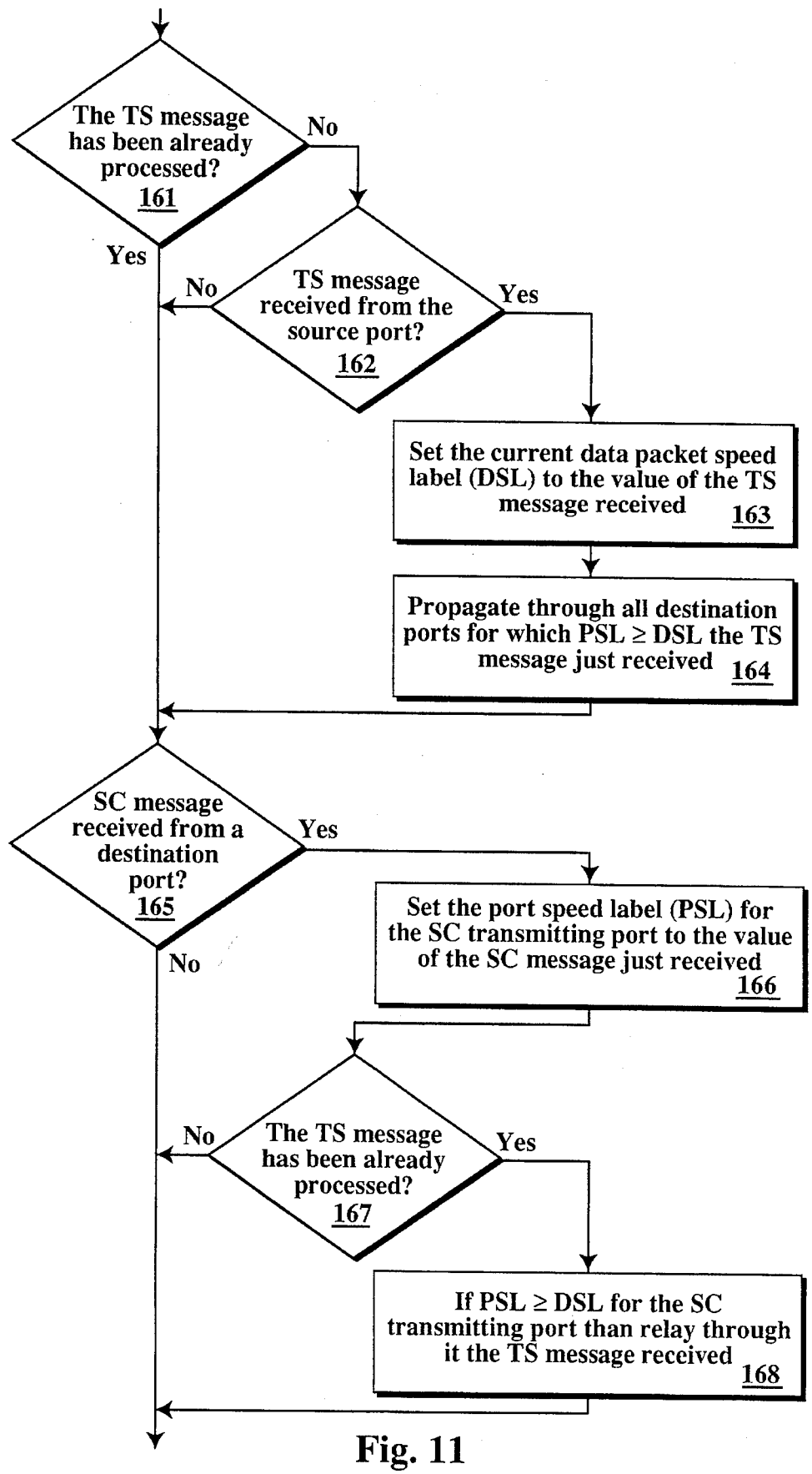
FIGS. 11 and 12 are flowcharts showing an alternate embodiment of the speed messaging method shown in FIGS. 7 and 8.

In an alternate embodiment of the speed messaging method for a relaying node 10,12 (i.e., step #6 of FIG. 4), steps #161, 162 and 163 of FIG. 11 are equivalent to steps #61, 62 and 63 of FIG. 7. However, step #164 is significantly different in that the relaying node 10,12 generates and transmits a TS message through all destination ports 7 for which the PSL≧the DSL. Again, steps #165 and #166 are the same as steps #65 and #66 of FIG. 7. In step #167, however, if a TS message has already been processed during the current data signal transfer phase, then the relaying node 10,12 verifies whether a TS message needs to be relayed through the just labeled port. In step #168, if the new PSL of the just labeled port is greater than or equal to the DSL, then the relaying node 10,12 transmits through this port the TS message corresponding to the DSL.

Figure 8:
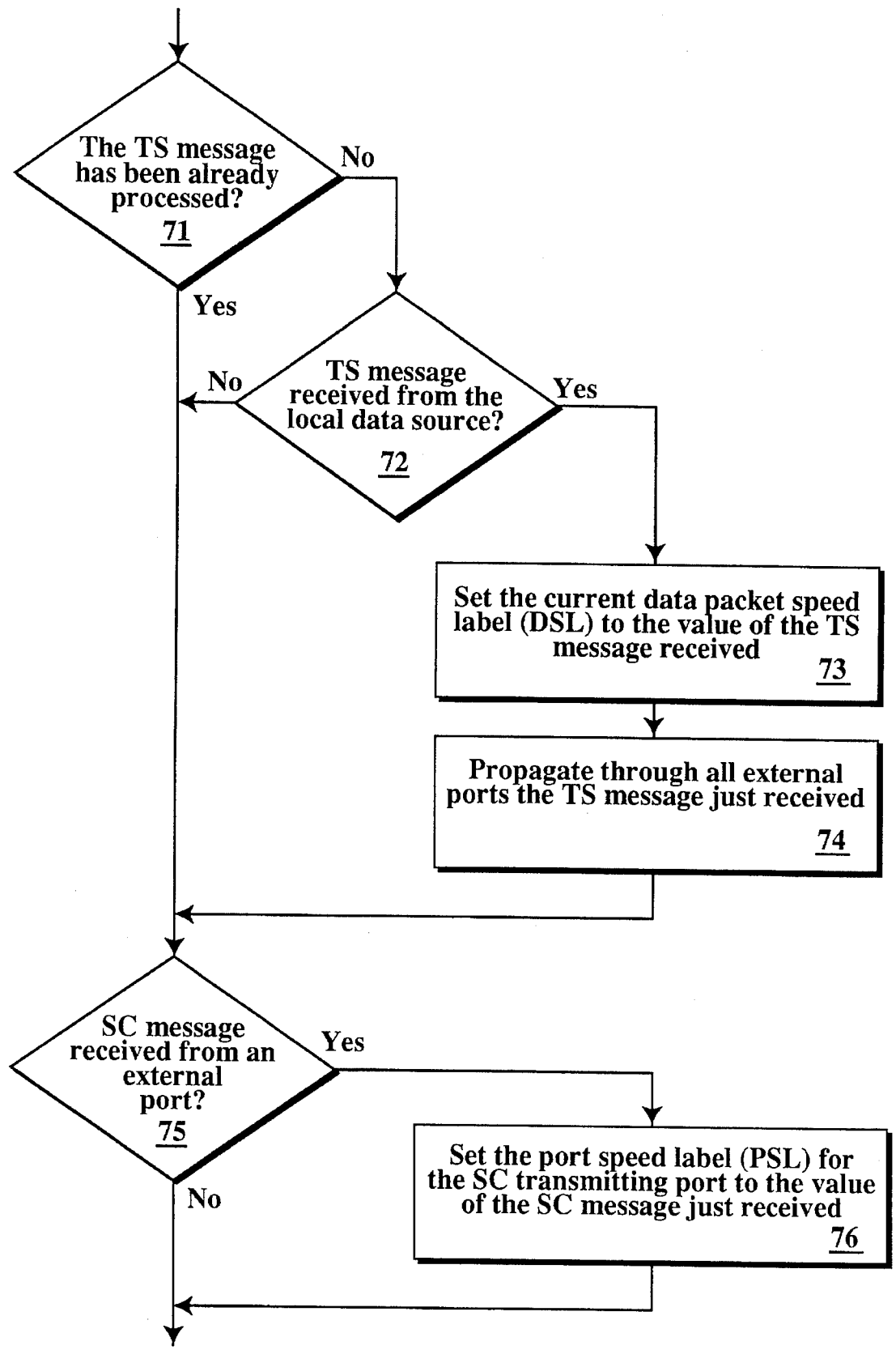
Figure 9:
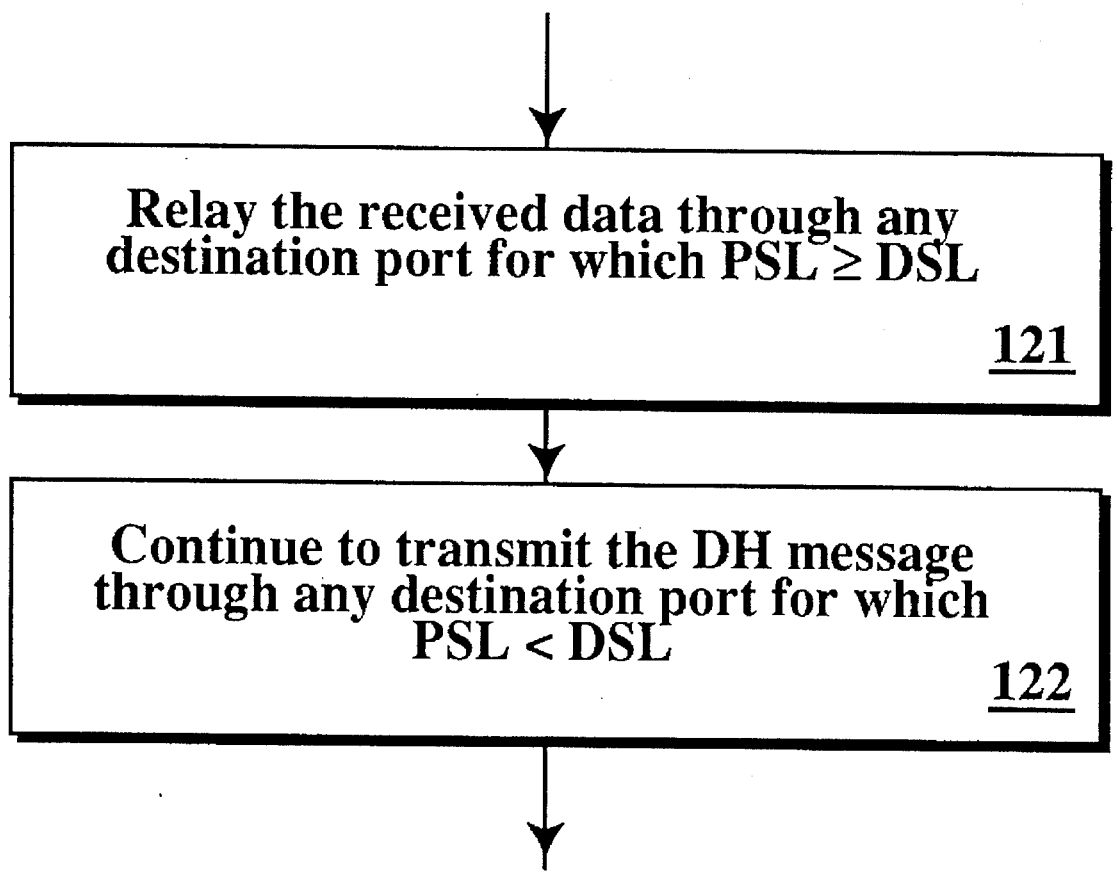
FIGS. 9 and 10 are flowcharts showing the actual data signal relay method and the data signal transfer method for a relaying node and a transmitting node, respectively.
Figure 10:
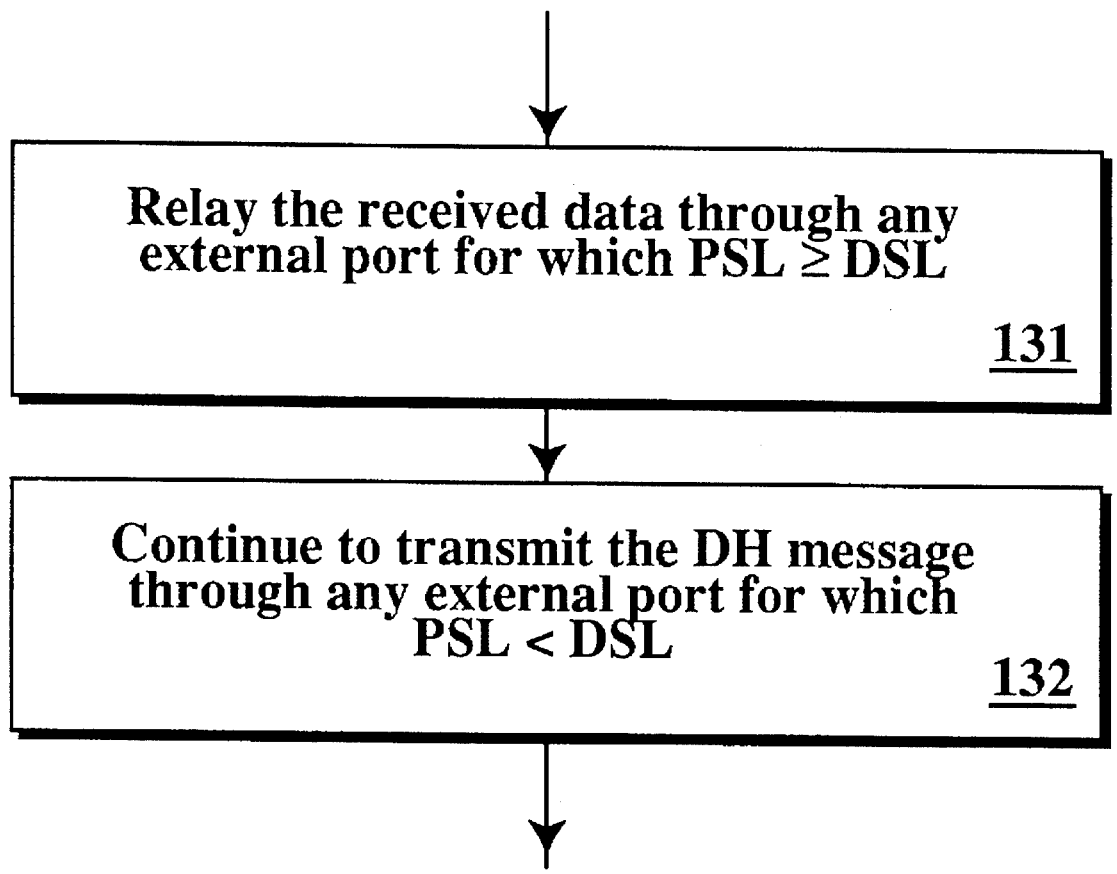

In step #71 of FIG. 8, which is a detailed flowchart of step #7 of FIG. 4, the transmitting node 8 expects to receive a TS message. If a TS message has already been processed during the current data signal transfer phase, the transmitting node 8 skips the TS message processing sequence and continues with the SC message processing sequence. In step #72, if a TS message has not been processed yet during the current data signal transfer phase, it is checked whether such a message has been received. If not, the transmitting node 8 continues with the SC message processing sequence. In step #73, if the transmitting node 8 has received a TS message from its local host 3 (i.e., through its internal controller port), and this message has not yet been processed, it changes its DSL to the value of the received TS message. In step #74, the transmitting node 8 generate and transmits a TS message through all external ports independent of the individual PSL's. It then continues with the SC message processing sequence. In step #75, if an SC message has been received, it then processes this message. In step #76, the transmitting node 8 sets the PSL's of the ports through which the SC message has been received to the value of the SC message.

Figure 12:
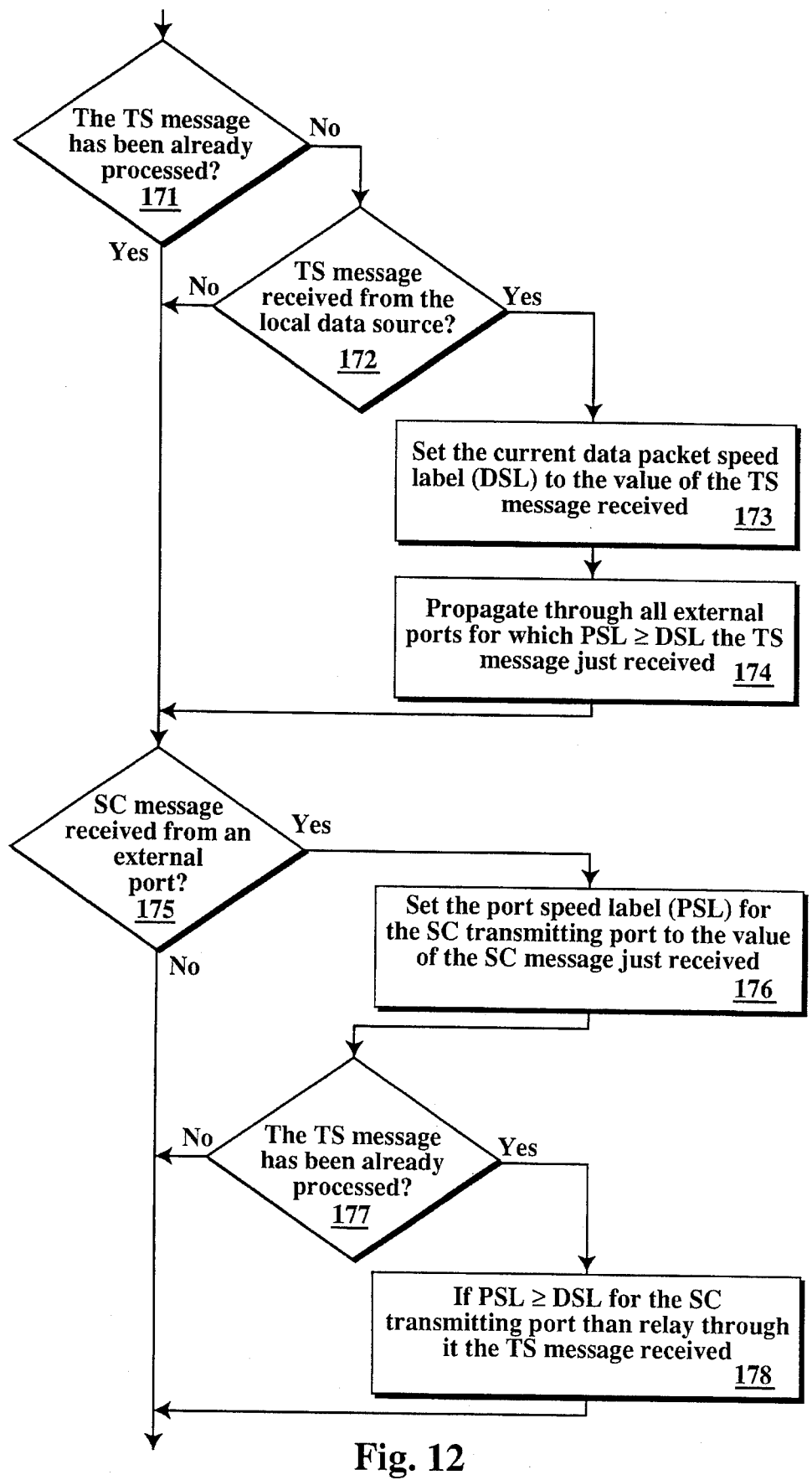

In an alternate embodiment of the speed message exchange for a transmitting node (i.e., step #7 of FIG. 4), steps #171, 172 and 173 of FIG. 12 are equivalent to steps #71, 72 and 73 of FIG. 8. However, step #174 is significantly different in that the relaying node 10,12 generates and transmits a TS message through all external ports for which the PSL≧the DSL. It then continues with the SC message processing sequence. Again, steps #175 and #176 are equivalent to steps #75 and #76 of FIG. 8. In step #177, however, if a TS message has already been processed during the current data signal transfer phase, then the transmitting node 8 verifies whether a TS message needs to be relayed through the just labeled port. In step #178, if the new PSL of the just labeled port is greater than or equal to the DSL, then it relays through this port the TS message corresponding to its DSL.

In steps #8 and #9 of FIG. 4, if a BI message is received by the relaying node 10,12 or the transmitting node 8, respectively, the respective node immediately returns to the arbitration phase. In steps #10 and #11, the relaying nodes 10,12 and transmitting node 8 respectively continue with the speed messaging sub-phase as long as no incoming data signal transfer is detected from their respective source ports 5 or internal ports 6.

In steps #12 and #13, the relaying nodes 10,12 and the transmitting node 8 respectively relay and transmit the data signal to their adjacent nodes. In step #121 of FIG. 9, which is a detailed flowchart of step #12, the relaying node 10,12 relays the just received data signal transfer through all of its destination ports 7 for which the PSL≧the DSL. As an alternative, however, when the PSL<the DSL for a specific port, it generates and transmits a DH message as the substitute, mock signal (described above) through that destination port 7 as shown in Step #122. In step #131 of FIG. 10, which is a detailed flowchart of step #13, the transmitting node 8 generates and transmits the data signal transfer through all external ports 7 for which the PSL≧the DSL. As an alternative, however, when the PSL<the DSL for a specific port, it generates and transmits a DH message as the substitute, mock signal through that external ports as shown in Step #132.

In steps #14, #15 and #16, the relaying nodes 10,12 and the transmitting node 8 respectively continue to relay and transmit the data signal transfer (or the mock signal transfer) received from the source port 5 and the internal port 6, respectively, until a BI message is detected. When the BI message is received the respective nodes return to the arbitration phase.

IV. THE EFFECT OF THE SPEED SIGNALING PROCESSING OF THE PRESENT INVENTION FOR NODES OF DIFFERENT TOPOLOGICAL POSITIONS

The following description is of one particular implementation of the above-described method for the speed messaging phase on a multi-speed bus. However, it would be obvious to one skilled in the art that other embodiments of the speed messaging method of the present invention can be implemented. With reference to FIGS. 13–18, these figures depict the chronological (from top to bottom) exchange of the common mode speed messages in addition to the differential data messages transmitted between an upstream relaying node 10 (or the transmitting node 8) and a downstream relaying node 12. For simplicity in the following description, reference will be made only to a data signal transfer from an upstream relaying node 10 to a downstream relaying node 12.

Note that the arrows in the transmission channel represent information transfers. It includes common mode speed signals, differential mode control signals and the differential mode data transfers. The words in the transmission channel describe the bus state: arbitration, data header propagation (a special sub-state of the bus arbitration phase which defines the end of the bus arbitration phase and the beginning of the bus data transfer phase), data packet transfer and bus idle (a special sub-state of the bus arbitration phase which defines the end of the bus data transfer phase and the beginning of the bus arbitration phase). Also note that the words outside the transmission channel describe the node state for the specific port involved with this link. Words grouped in the same boxes represent operations which occur in parallel to at least some extent.

The exchange of speed messages takes place on every link 2 of the bus and it precedes every data transfer. The speed messaging phase consists of two sub-phases comprising a "speed" phase and a "capability" phase. In both phases, the duration of the transmission is timed by the transmitting node. It is its responsibility to maintain the speed signal on the line 2 for a predetermined amount of time, labeled as $t_{sst}$ (speed signaling transfer time). Specifically for the speed phase, the up-stream node is the transmitting node and for the capability phase, the down-stream node is the transmitting node. By definition, a low speed node capable of only 100 Mbps will not participate in the capability phase since the lack of a SC message from a particular node indicates that it is a 100 Mbps node. Also, a data signal transfer with a speed of 100 Mbps will not be preceded by a TS message since all nodes 1 coupled to the bus can decode a transmission of 100 Mbps.

In the speed phase, the TS message propagates in the same direction as the data signal transfer it precedes. It is possible that at some point on the bus, the propagation of the TS message will end if the capability of a downstream relaying node 12 is less than the speed of the data signal transfer. With reference to FIGS. 13–18, the speed phase starts as soon as an upstream relaying node 10 has received the TS message corresponding to the incoming data signal transfer, and it ends before the beginning of the data signal transfer.

Specifically, the TS message is expected as soon as the data header message has been detected. The implementation of the data header message can be implicit such as the termination of a specific arbitration message. In the present invention, however, the data header message is preferably explicit such as a dedicated message so that the mock, differential data signal described above can be utilized. The guard band between the receiving of the TS message from an upstream relaying node 10 and the beginning of the speed phase is labeled $t_d$. This time interval should be large enough to enable the upstream relaying node 10 to properly detect the data header but also small enough so as not to adversely affect the performance of the bus. The guard band between the end of the speed message exchange and the beginning of the data signal transfer is labeled $t_s$ (speed timing). This time interval should be large enough to allow the upstream relaying node 10 to process and propagate the TS message, but again, too large a value will adversely affect the bus performance. The downstream relaying node 12 expects the TS message on a given link 2 as soon as it detects the data header message on that link 2. In addition, as previously explained, the downstream relaying node 12 has a default speed setting of 100 Mbps until a TS message is received. That is, the downstream relaying node 12 expects any data signal transfer to be at the rate of 100 Mbps unless this setting is modified by the reception of a TS message.

In the speed capability phase, the SC message propagates in the opposite direction of the data signal transfer it precedes (shown in FIGS. 13–18). The SC message informs the upstream relaying node 10 of the speed capability of the downstream relaying node 12. This phase occurs on every link 2 of the bus before every data signal transfer on the bus.

Specifically, the capability phase starts as soon as a node receives a data header message through the link 2. The guard band between the detection of the data header message and the data signal transfer is labeled $t_c$ (capability timing). This time interval should be kept to a minimum. After transmission of the data header message, the upstream relaying node 10 waits no longer than twice the duration of $t_{sst}$ plus $t_c$ to receive the SC message from the downstream relaying node 12. The default for the SC message is 100 Mbps so that the upstream relaying node 10 assumes the downstream relaying node 12 is capable of only 100 Mbps transmissions unless this assumption is modified by the SC message.

In terms of timing, the exchange of speed messages depends upon the position of the specific link 2 in the bus with respect to the critical path. The critical path is the combination of links forming a transmission channel for a specific data signal transfer which connects the transmitting node 8 and the root node (the node which is so positioned in the bus that it acts as the arbitration mechanism. In other words, the root node is that node, which after a bus initialization, is designated as the bus access arbiter by all the nodes connected to the bus. For more information on the root node, see U.S. Pat. No. 5,394,556, entitled *"Method and Apparatus for Unique Address Assignment, Node Self-Identification and Topology Mapping for a Directed Acyclic Graph"*, Ser. No. 07/994,983, entitled *"Method and Apparatus for Arbitrating on an Acyclic Directed Graph"*, Ser. No. 07/994,117, entitled *"Method and Apparatus for Arbitrating on an Acyclic Topology Collection of Nodes into an Acyclic Directed Graph"*, each of which is assigned to the assignee of the present invention.

If the link 2 is in the critical path or if the upstream relaying node 10 is the root node, then the upstream relaying node 10 propagating the data header message has available to it the incoming data signal transfer. Thus this node will generate the data header message and follow it immediately with the TS message. In this situation, the speed phase and the capability phase will overlap. It is important to this node that a minimum time $t_e$ should be guaranteed between the receiving of the SC message and the beginning of the data signal transfer. This time interval should be sufficient for a node to both compare the TS and SC messages and implement the appropriate retransmission action.

Figure 13:
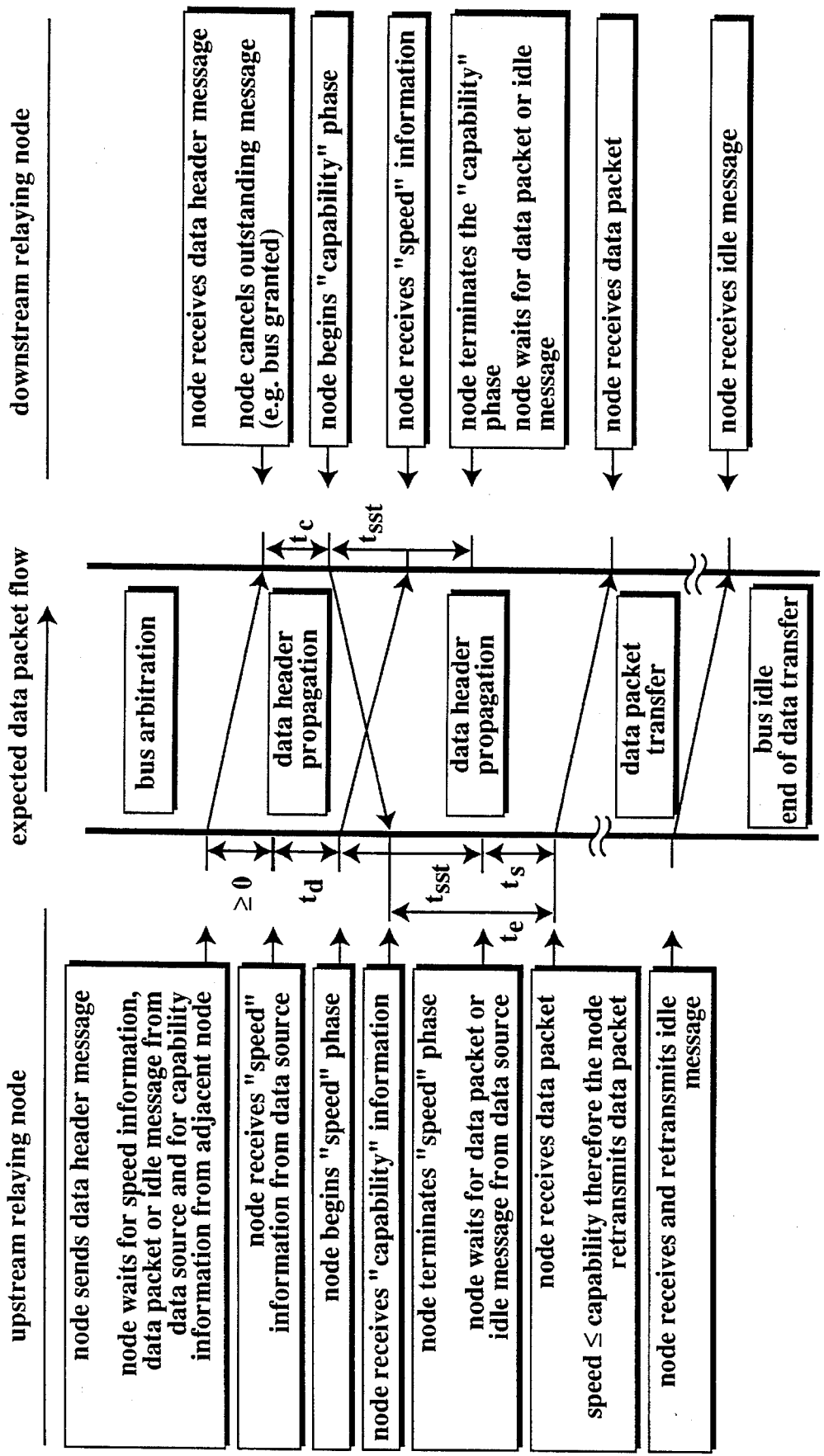
FIG. 13 is a space-time diagram showing an implementation of the speed messaging method between adjacent nodes wherein the capability phase and the speed phase overlap, and the data signal transfer is received and retransmitted.
Figure 14:
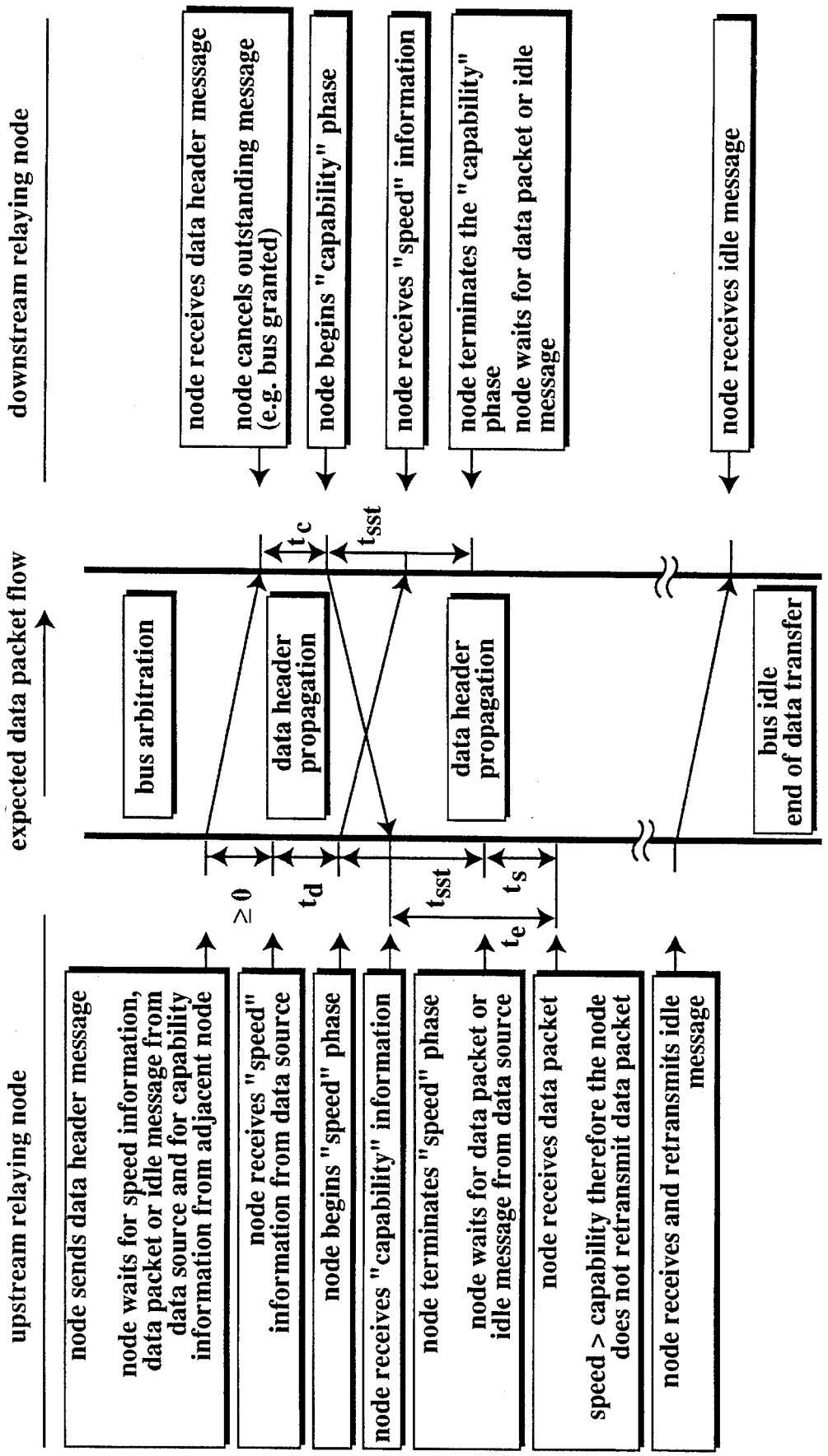
FIG. 14 is a space-time diagram showing an implementation of the speed messaging method between adjacent nodes wherein the capability phase and the speed phase overlap, and the data signal transfer is received but not retransmitted.
Figure 15:
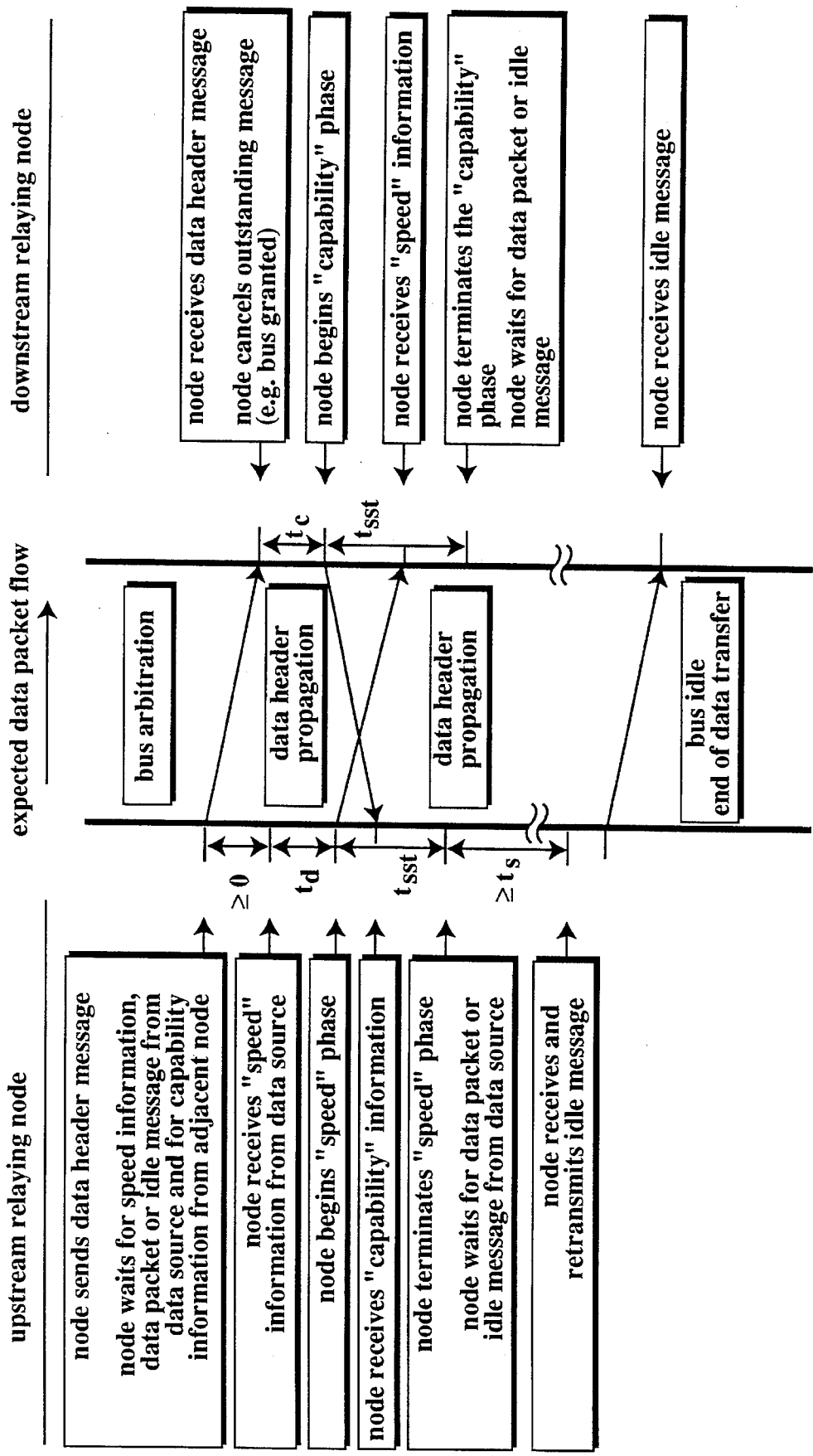
FIG. 15 is a space-time diagram showing an implementation of the speed messaging method between adjacent nodes wherein the capability phase and the speed phase overlap, but the data signal transfer is not received.
Figure 16:
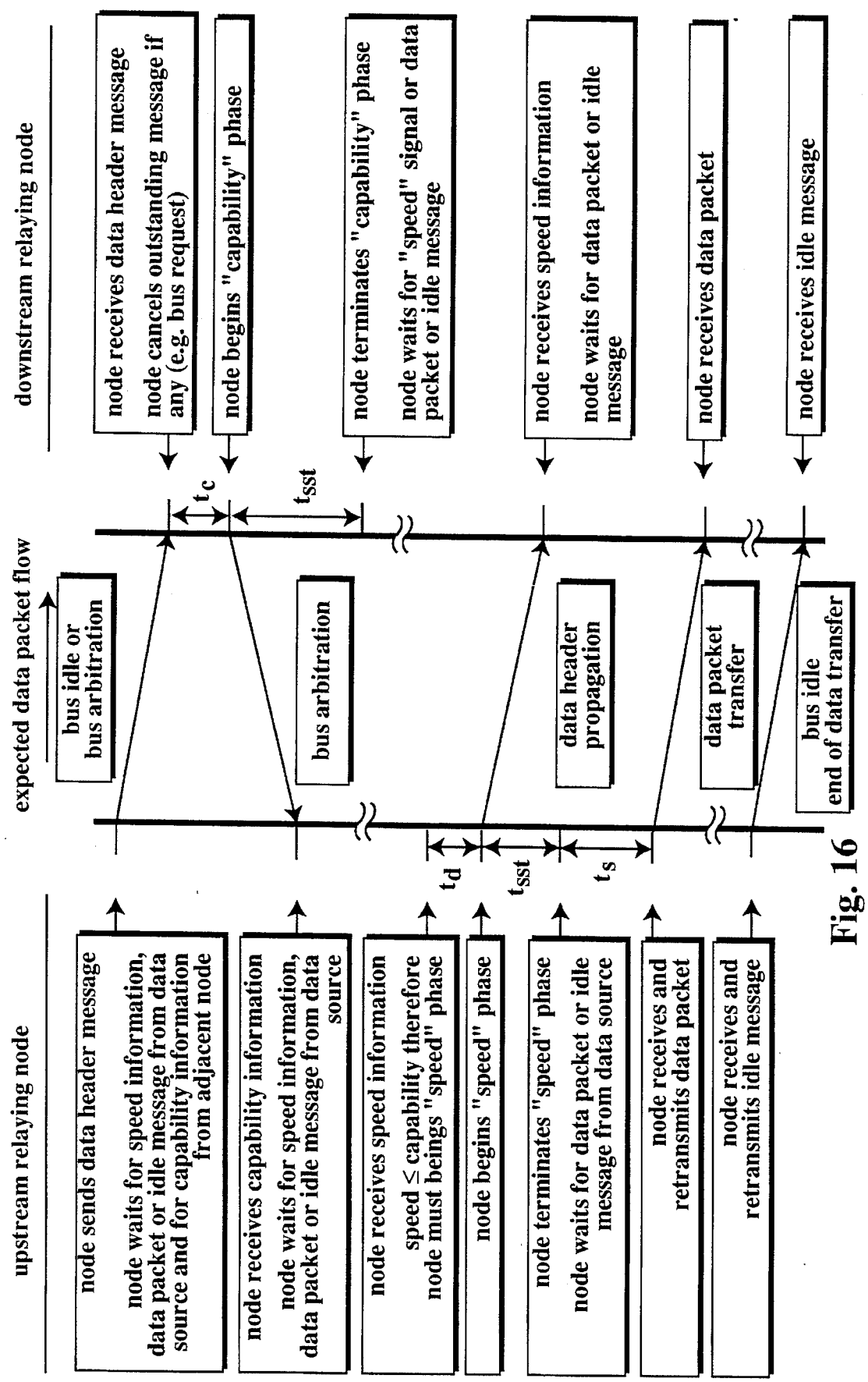
FIG. 16 is a space-time diagram showing an implementation of the speed messaging method between adjacent nodes wherein the capability phase precedes the speed phase, and the data signal transfer is received and retransmitted.

FIG. 13 depicts a situation in which the speed message exchange is completed with the receiving and retransmitting of the data signal transfer. In the situation presented in FIG. 14, the data signal transfer is received but is not retransmitted because the capability of the downstream relaying node 12 is less than the speed of the data signal transfer. FIG. 15 presents the situation in which the data signal transfer is not received nor retransmitted by the upstream relaying node 10 because it has been replaced with a data header message by an upstream relaying node 10.

If the specific link 2 is outside the critical path, then the upstream relaying node 10 propagating the data header message does not know the speed of the incoming data signal transfer when it generates the data header message. Thus this node will transmit the data header message and follow up with the speed phase when the bus arbitration on the critical path has been completed and the speed of the incoming data signal transfer is received. In this situation, the capability phase will precede the speed phase, and in certain cases, the speed phase can be omitted altogether. A complete scenario terminating with the reception and retransmission of the data signal transfer is presented in FIG. 16.

Figure 17:
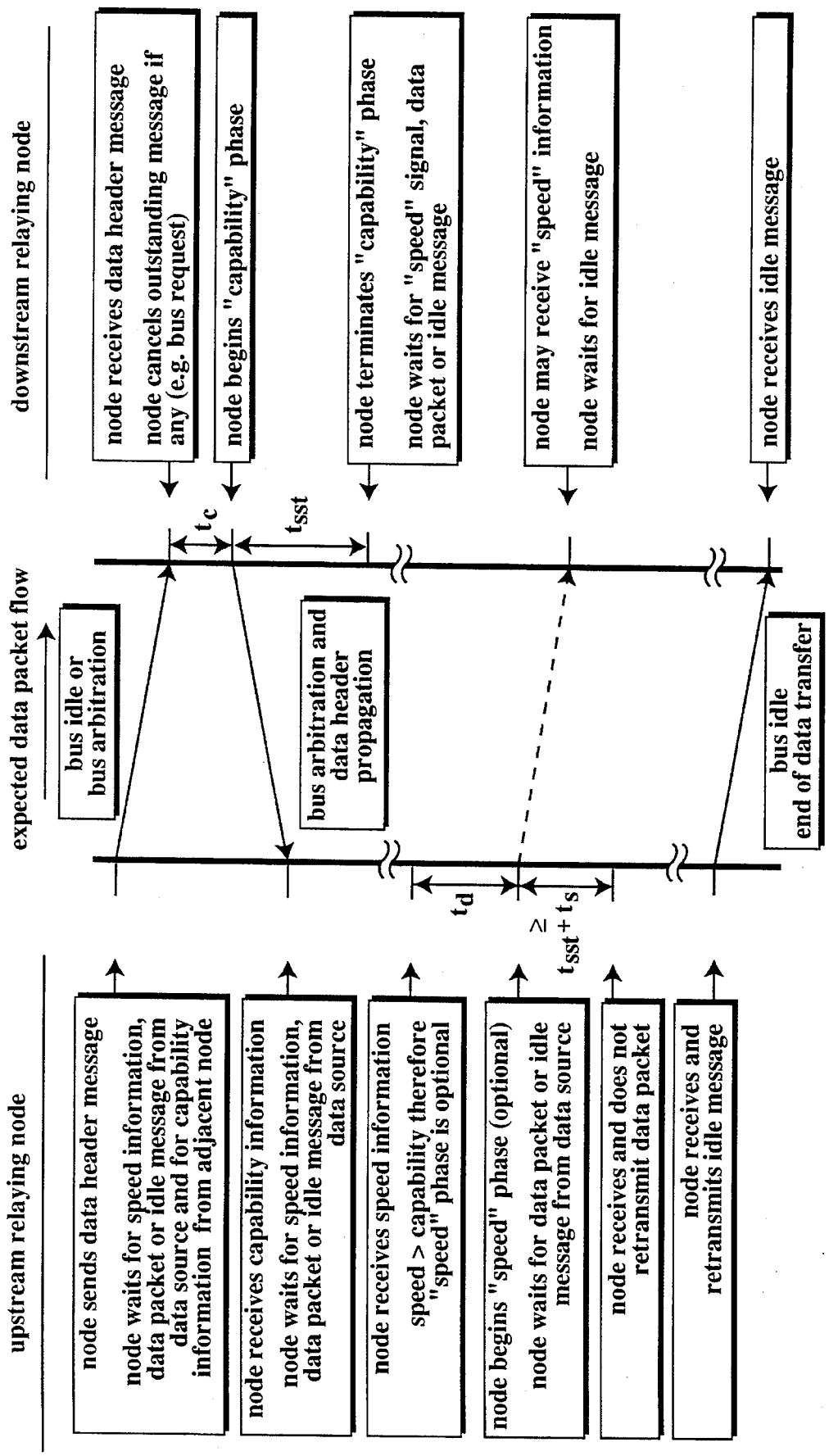
FIG. 17 is a space-time diagram showing an implementation of the speed messaging method between adjacent nodes wherein the capability phase precedes the speed phase, and the data signal transfer is received but not retransmitted.
Figure 18:
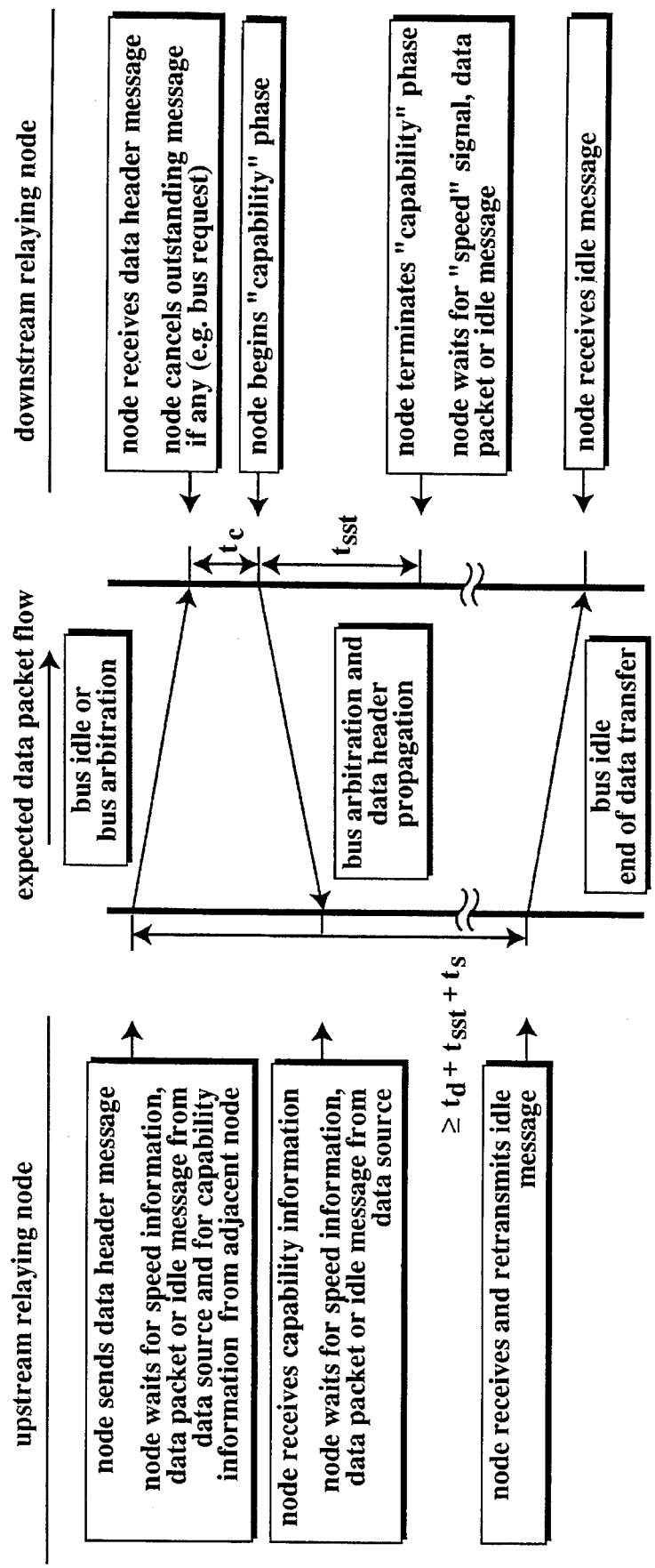
FIG. 18 is a space-time diagram showing the method for exchanging speed messages between adjacent nodes wherein only the capability phase is in effect and the data signal transfer is not received.

If the SC message arrives before the TS message and the speed capability of the downstream relaying node 12 is less than the transmission rate, then the upstream relaying node 10 may elect to skip the speed phase entirely. In this case, the speed phase becomes optional as shown in FIG. 17. It is also possible that the TS message propagation is interrupted by an upstream relaying node 10 which determines that it cannot relay the data signal transfer as is shown in FIG. 18.

V. COMMON MODE SIGNALING TECHNIQUE

Figure 19:
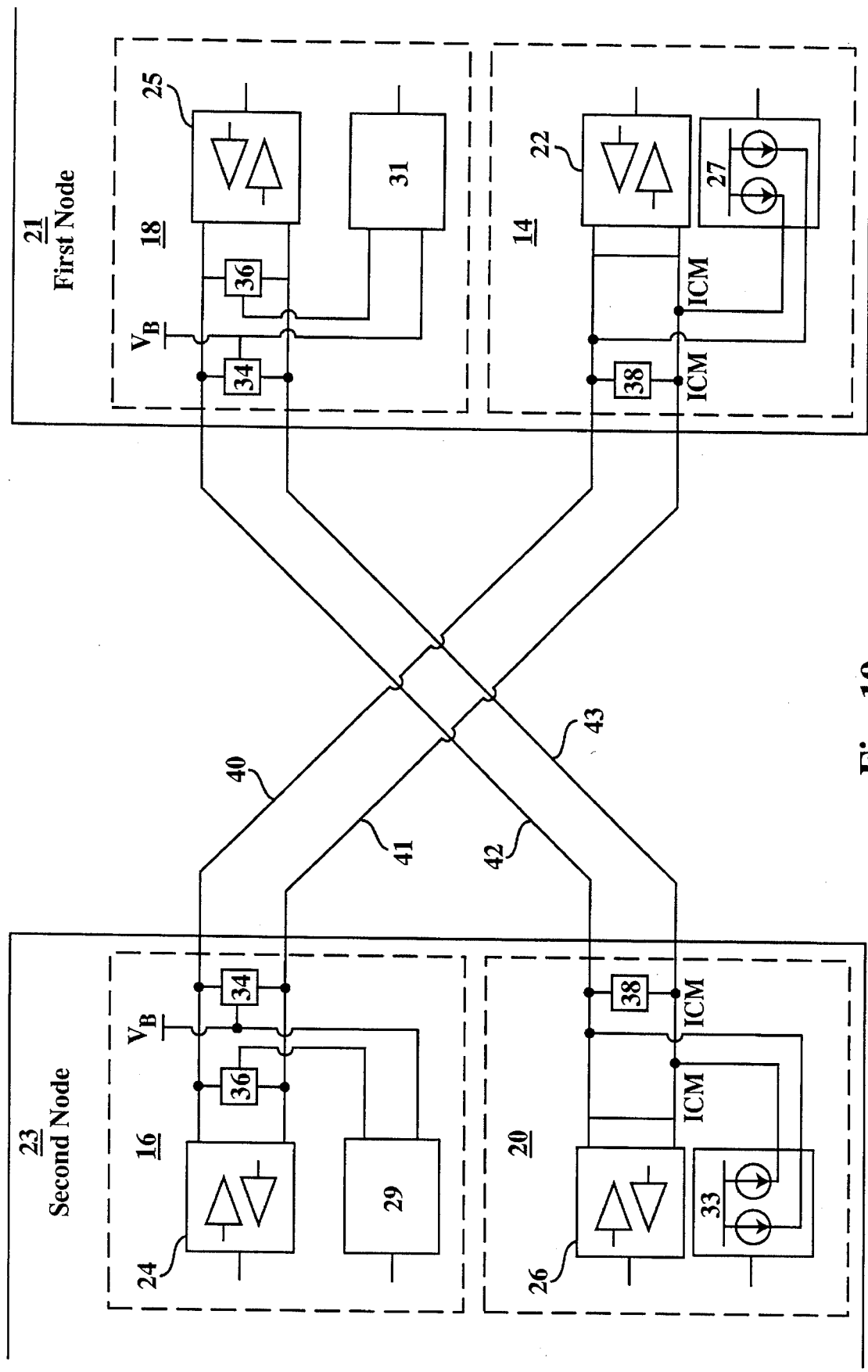
FIG. 19 is a block diagram of the apparatus of the present invention showing the implementation of a full duplex speed signaling mechanism in each of two adjacent nodes interconnected by a differential, serial twisted pair bus such as the one utilized in the IEEE P1394 standard.

According to one embodiment of the present invention, the speed messaging method is implemented in a differential bus comprising a series of links 2 between adjacent nodes 1 as described above. The objective of such an implementation is to provide a means for the transmission of speed messages concurrent (or in parallel) with the transmission of control signals on the bus using a common mode signaling technique. As shown in FIG. 19, a bus comprising at least one transmission channel having first and second signal lines 40,41 interconnecting a first transceiver 14 of a first node 21 with a second transceiver 16 of a second node 23 is utilized for the transmission of both differential and common mode signals. In order to enable the concurrent transmission of differential and common mode signals, the first transceiver 14 comprises both a first differential transceiver 22 and a common mode transmitter 27. Correspondingly, the second transceiver 16 comprises both a second differential transceiver 24 and a common mode receiver 29.

In order to permit the full duplex transmission of common mode speed messages between the first and second nodes 21,23, the present invention preferably also comprises a third transceiver 20 of the second node 23 which corresponds to the first transceiver 14, and a fourth transceiver 18 of the first node 21 which corresponds to the second transceiver 16. Furthermore, in order to permit the implementation of the full duplex, speed messaging mechanism in the IEEE P1394 bus architecture environment (as will be described below), the communication links 2 between the first and second nodes 21,22 comprise two twisted pair signal lines. The first twisted pair comprises a first signal line 40 and a second signal line 41 which connect the first transceiver 14 of the first node 21 with the second transceiver 16 of the second node 23. The second twisted pair comprises a third signal line 42 and a fourth signal line 43 which connect the third transceiver 20 of the second node 23 with the fourth transceiver 18 of the first node.

In the following description of the common mode technique utilized in the present invention, reference will be made only to the transmission of differential and common mode signals from the first transceiver 14 of the first node 21 to the second transceiver 16 of the second node 23. In differential signaling, the first differential transceiver 22 of the first transceiver 14 outputs as a specific signal a differential voltage or current on each of the first and second signal lines 40,41. These voltages or currents are detected at the inputs of the second differential transceiver 24 of the second transceiver 16. For the detection of the differential signals, the second differential transceiver 24 comprises either a comparator or an operational amplifier.

In the implementation of common mode signaling concurrent with differential signaling, a current of a particular amplitude is driven on the first and second signal lines 40,41 by the common mode transmitter 27 of the first transceiver 14 to increase the over-all amplitude of the voltage on the signal lines 40,41 proximate to the second differential transceiver 24. Only the increase in the amplitude of the voltage present on the signal lines 40,41, apart from other signals that may be transmitted, is detected by the common mode receiver 29 of the second transceiver 16. In response, an appropriate common mode response signal corresponding to the specific increase in the voltage is output by the common mode receiver 29. The second differential transceiver 24 is left unaffected by the driving of the common mode current Icm since the common mode signaling mechanism is orthogonal to the differential signaling mechanism used in the multi-speed bus of the present invention. That is, the present invention is utilized in short distance busses which have a wider common mode range than necessary for differential signaling itself so that the excess margin can be used for the common mode signaling mechanism. However, the present invention may also be utilized in busses having a smaller common mode range as will be discussed below.

As shown in FIG. 19, the common mode transmitter 27 of the first transceiver 14 outputs to each of the first and second signal lines 40,41 a common mode current Icm having an amplitude which represent a specific speed setting forming either the TS message or the SC message as discussed above. Although this example describes the driving of a particular common mode current Icm, it is noted that in order to permit the use of the common mode signaling technique in an upward compatible bus architecture scheme, it is foreseen that the slowest node (i.e., a 100 Mbps node) does not have to drive any current at all. This is because this node does not require a common mode transmitter or a common mode receiver since it may only transmit and receive at the default speed setting. Hence, for a 100 Mbps node, no current (representing the SC message) is driven on the signal lines so that the reception of no current by another common mode receiver will indicate the default speed setting of 100 Mbps.

However, for a 200 Mbps node, as shown in FIG. 19 (i.e., each of the first and second nodes 21,22), the common mode transmitter 27 must be able to output one current level (i.e., 2 ma) corresponding to a 200 Mbps speed setting in addition to no current (i.e., an off state of 0 ma) corresponding to the default value. Similarly, a 400 Mbps node requires a common mode transmitter that can output two current levels (i.e., 2 ma and 5 ma) corresponding to a 200 Mbps and a 400 Mbps speed setting, respectively, in addition to no current (i.e., an off state of 0 ma) corresponding to the default value. As would be obvious to one skilled in the art, similar increases in the current amplitudes would be required for the higher speed settings that would be utilized by newer, faster nodes.

Figure 22:
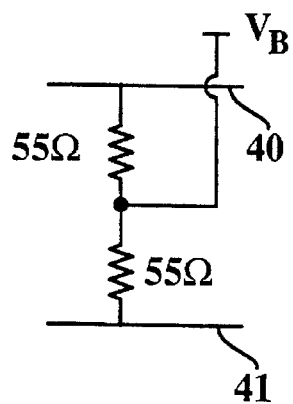
FIG. 22 is a detailed circuit of the first coupling within the second transceiver.
Figure 23:
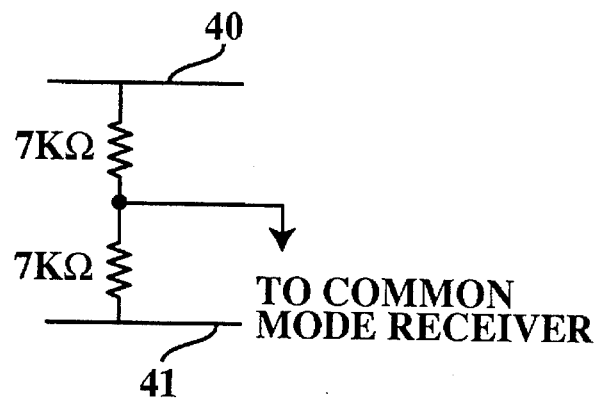
FIG. 23 is a detailed circuit of the second coupling within the second transceiver.

The common mode current Icm generated by the common mode transmitter 27 is transmitted along the signal lines 40,41 to the second node 23 where a voltage bias $V_B$ is applied to the signal lines 40,41 through a first coupling 34. The first coupling 34 (shown in FIGS. 19, 20 and 22) combines the signals present on each of the signal lines with the voltage bias $V_B$. In addition to the first coupling 34, a second coupling 36 (shown in FIGS. 19, 20 and 23) for connecting the first and second signal lines 40,41 is provided between the first coupling 34 and the second differential transceiver 24 of the second node 23. As shown in detail in FIG. 23, this second coupling 36 forms a resistive adder which comprises first and second high impedance resistors of approximately 7KΩ placed in series between the first signal line 40 and the second signal line 41 for calculating the common mode voltage present on the lines.

Figure 24:
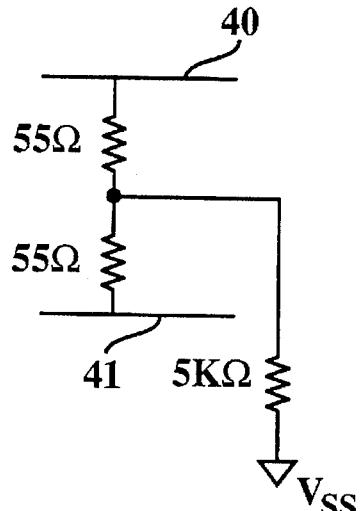
FIG. 24 is a detailed circuit of the third coupling within the first transceiver.

In order to prevent the reflection of differential signals transmitted to the second node 23, the first coupling 34 comprises a first differential termination means. As shown in detail in FIG. 22, the first differential termination means comprises first and second low-impedance resistors of approximately 55Ω placed in series between the first and second signal lines 40,41, with the first coupling 34 between the signal lines 40,41 and the voltage bias $V_B$ disposed at a midpoint between the first and second low-impedance resistors. The first coupling role is essential. The first coupling provides a reference common mode bias for the differential transmission line formed by 40 and 41. This bias voltage is used by the common mode receiver 29 as a reference to detect the common mode signals transmitted by the transmitter 27. Also connected to the signal lines 40,41 in the first node 21 is a third coupling 38 comprising a second differential termination means. As shown in detail in FIG. 24, the second differential termination means comprises two low-impedance resistors of approximately 55Ω placed in series about the third coupling 38. This termination means also has a midpoint between the two low-impedance resistors which is pulled to ground through a high-impedance resistor of approximately 5KΩ.

Figure 20A:
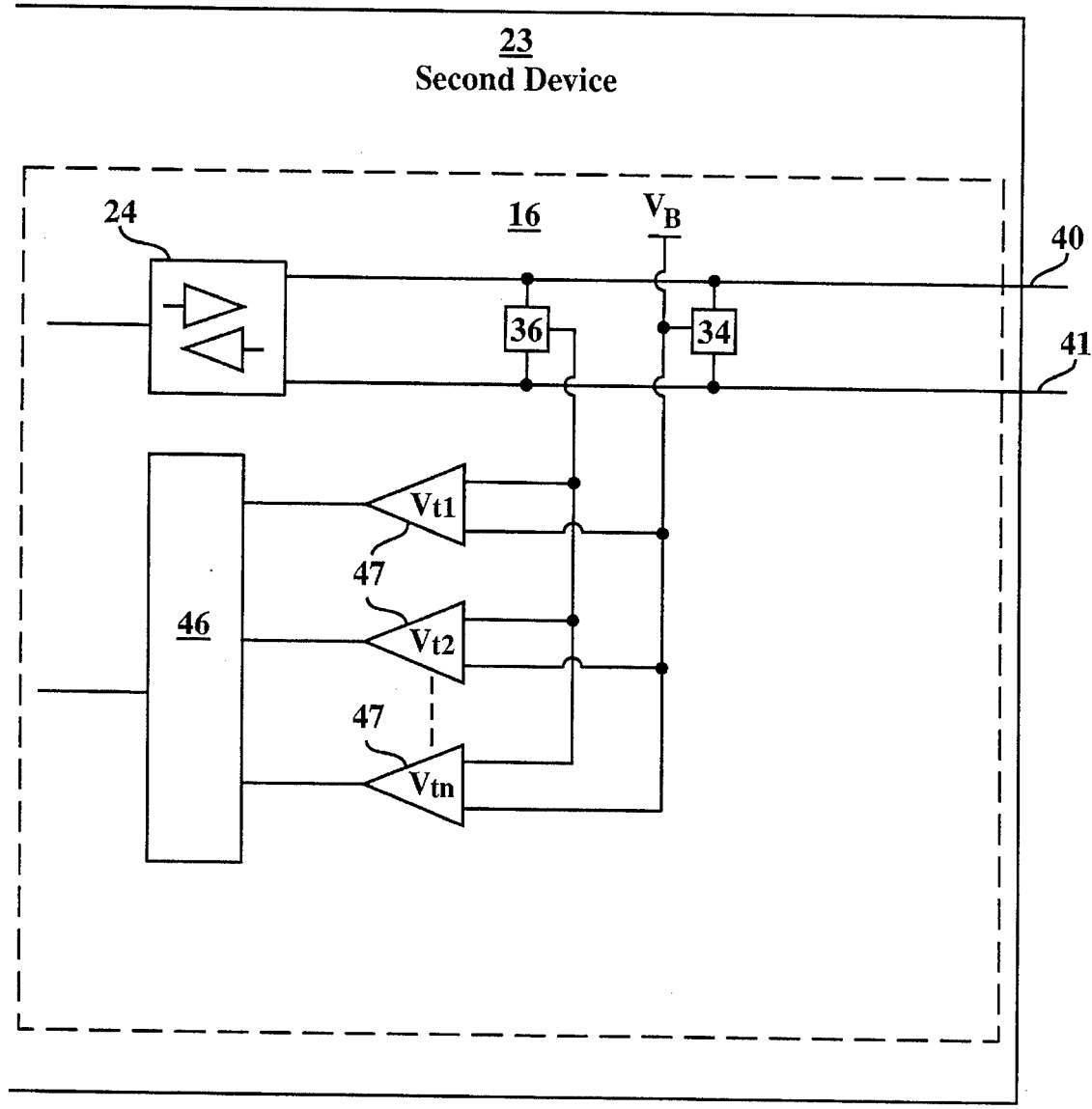
FIG. 20a is a detailed block diagram of the second transceiver showing both a plurality of common mode receivers of the transceiver.

So as to enable the reception a plurality of different speed settings via the common mode signaling technique, a node 1 which is able to operate at "n+1" different speed settings, as shown in FIG. 20, requires "n" common mode receivers 47 with progressively higher detection thresholds Vt where $Vt1<Vt2<\ldots<Vtn$. Each common mode receiver 47 preferrably comprises a voltage comparator or an operational amplifier with a built-in voltage threshold Vt for comparing the bias voltage $V_B$ with a first voltage derived from the second coupling 36. The output of each receiver 47 changes state when the voltage difference between its upper input and its lower input is greater than or equal to Vt. In addition, when a transceiver 16 comprises more than one common mode receiver 47, it is necessary to implement a multiplexor 46 so as to decode the outputs of the receivers 47 to obtain the proper speed setting transmitted by the common mode transmitter. Accordingly, a 100 Mbps node need not comprise a common mode receiver since the current driven on the signal lines by the common mode transmitter representing a 100 Mbps speed setting is 0 ma. A 200 Mbps node need only comprise a single receiver having a threshold of 55 mv (as shown in FIG. 19) for differentiating between no common mode current (i.e., a 100 Mbps speed setting) and the presence of a common mode current (i.e., a 200, 400, etc. speed setting). In contrast, however, a 400 Mbps node requires at least two receivers having a threshold of 55 mv and 137.5 mv for differentiating between a 100, a 200 and a 400 Mbps speed setting.

VI. IMPLEMENTATION IN THE IEEE P1394 BUS ARCHITECTURE ENVIRONMENT

Figure 21:
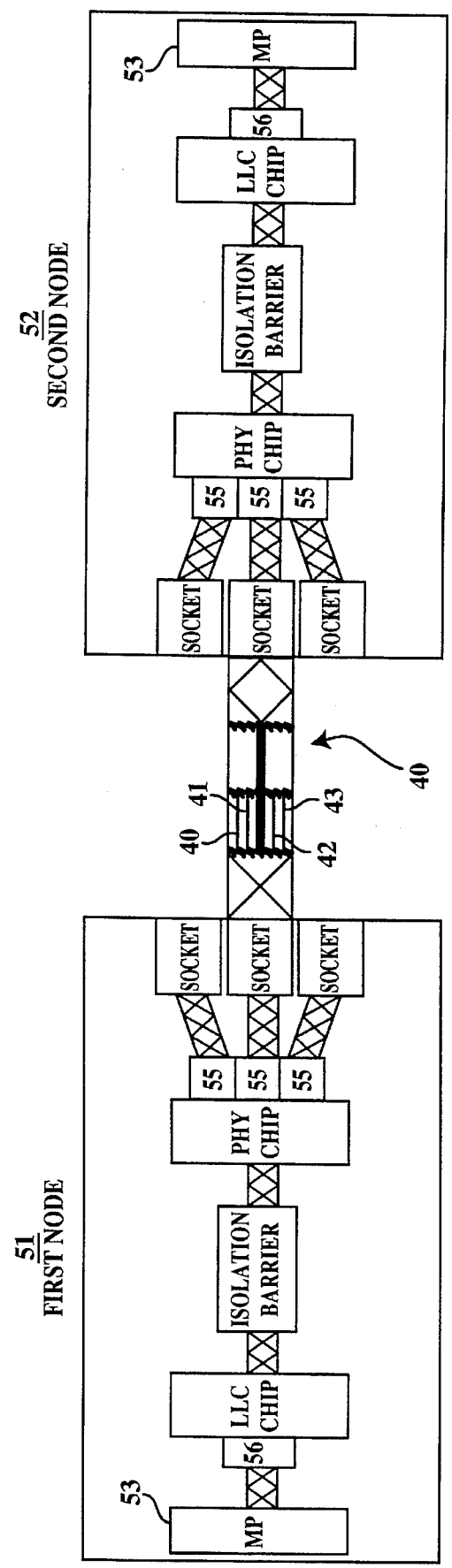
FIG. 21 is a block diagram of a specific link between two adjacent nodes in a point-to-point type bus architecture pursuant to the IEEE P1394 bus architecture scheme showing the implementation of the PHY and LLC chips in each of the nodes.

According to another embodiment of the present invention, a method and apparatus is provided for the transmission of speed messages independent of the data signal transfer on a particular multi-speed bus architecture scheme designed pursuant to the IEEE Standards Document P1394 entitled "High Performance Serial Bus" (draft 5.3v1 of Oct. 14, 1992), this document being appended hereto for reference. The standard described in P1394 is designed to provide a high speed serial bus having a low cost interconnection between nodes within the computer system. As shown in FIGS. 1 and 21, each node 1 connected to the serial bus comprises a physical channel interface chip (or "PHY" chip) directly connected to the serial bus for the reception and transmission of control and data signals. Each node 1 also comprises a link layer chip (or "LLC" chip) which transmits to and receives from the PHY chip both the data and control signals at a fixed speed. The LLC chip also interfaces with the local host 3 of the node 1 in order to process the data received from the PHY chip.

In this embodiment of the present invention, the transmission of data signals between PHY chips of adjacent nodes is performed at various speeds depending upon the speed capabilities of the interconnected nodes 1. Therefore, in order for a specific PHY chip to properly transmit data signals to the PHY chip of an adjacent node, it must know both (1) the transmission speed of the data signal transfer propagated on the bus (i.e., the TS message), and (2) the speed capability of the adjacent node (i.e., the SC message). Hence, the speed messaging method using the common mode signaling technique of the present invention is suitably adapted for use in the P1394 bus architecture environment.

Due to the fact that the transmission of data signals is performed by differential signaling, the common mode signaling technique can be utilized to superimpose the speed messages over the uncorrelated differential signals transmitted during the arbitration phase. In this way, the speed messages can be transmitted between PHY chips independent of the speed of the data signal transfer (i.e., at a fixed speed). Furthermore, since the common mode speed messages are sent in parallel with the arbitration signals, the upstream relaying node can be apprised of the requisite speed information before the transmission of the data signal to an adjacent downstream node and without having to pause in the transmission of the arbitration signals.

VII. COMMON MODE VOLTAGE RANGE SOLUTION

In the implementation of the present invention, the speed messaging method using the common mode signaling technique offers significant advantages but also raises the problem of the common mode voltage range available for the differential transceivers. For the purpose of this invention, it is important that the first and second differential transceivers 14,16 are able to reject common mode signals within a range large enough to enable the operation of the common mode transmitter 27 and receiver 29.

The common mode signaling used in the present invention is quite appropriate for a reduced size bus implementation such as the P1394-type bus architecture since the differential transceivers 22,24 have a much larger common mode range than the minimum required for the differential mode communication mechanism. However, the problem of the available common mode range will become more significant in the future as the power supply voltage available decreases (from a 5 V technology to a 3 V technology), thus reducing the total available transceiver common mode voltage range. At the same time, future technological developments will increase the number of different operating speeds for the nodes 1, thereby increasing the number and current amplitudes of the common mode signals that have to be accommodated. For example, the present P1394 implementation provides signaling capabilities for 100 Mbps (0 ma), 200 Mbps (2 ma) and 400 Mbps (5 ma). If future nodes have to accommodate higher speeds, it is obvious that larger common mode currents such as 10 ma for an 800 Mbps capability and so on will have to be used. An increase in the common mode current amplitude therefore has an immediate consequence to the increased common mode voltage range required for the differential transceivers 22,24.

This problem can be dissected into two distinct issues: First, the common mode voltage range of already existing differential transceivers 22,24 may not be large enough to handle future common mode signals. For example a 200 Mbps node is expected to receive and decode the 0 ma and the 2 ma common mode signals and to recognize any other common mode signals as "greater than 2 ma". In practical terms, however, it is very difficult to guarantee that such a 200 Mbps node will have a sufficient common mode range to be able to properly interpret any future common mode signals greater than 2 ma. One solution to this problem is the use of the alternative implementation of the speed messaging method presented in FIGS. 11 and 12 instead of the implementations of FIGS. 7 and 8 respectively. Such an implementation will ensure that no port of a node 1 will receive a speed message having a current amplitude higher than the maximum current amplitude it is designed to transmit.

Figure 20B:
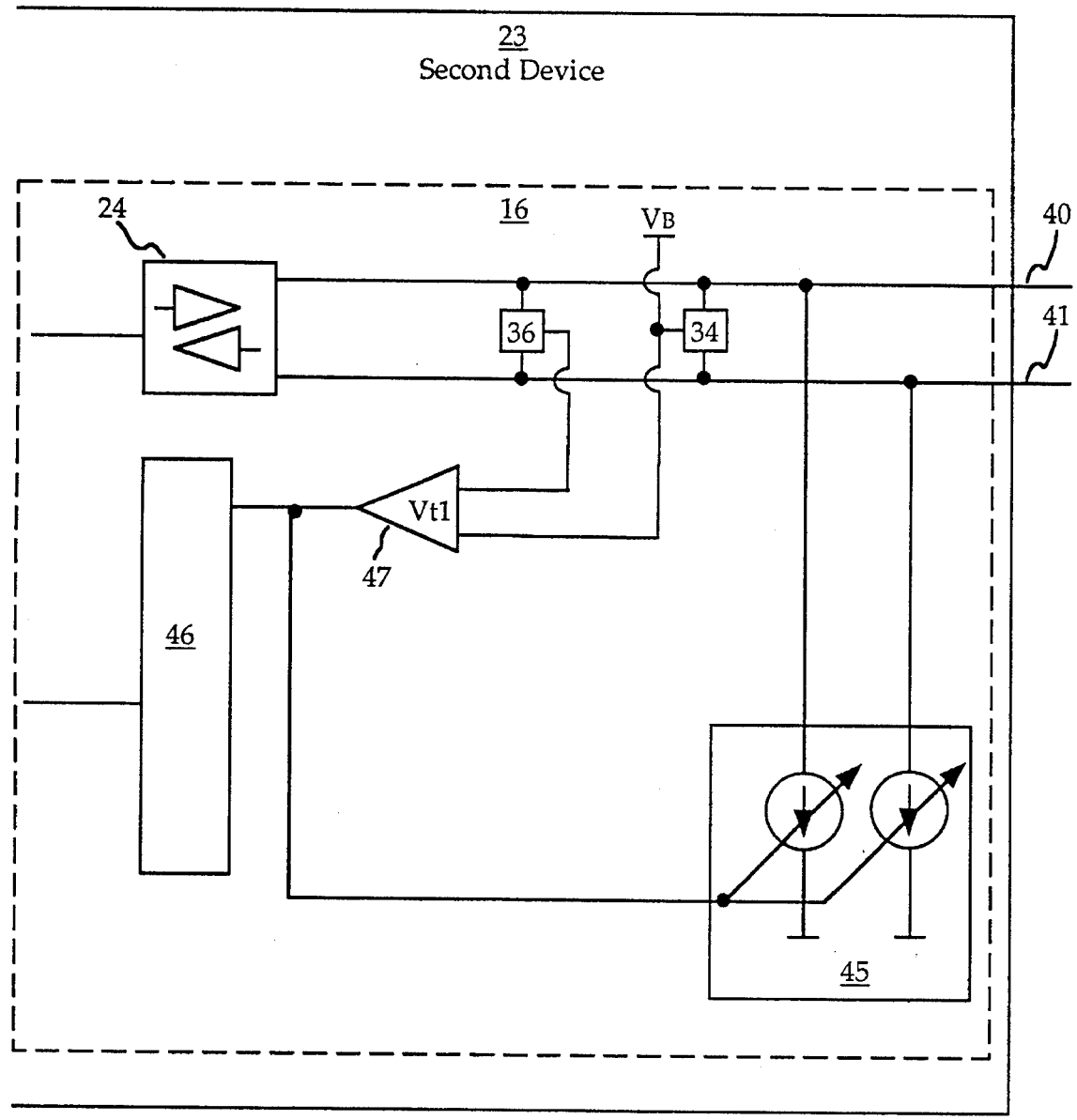
FIG. 20b is a detailed block diagram of the continuous implementation of the second transceiver showing both a plurality of common mode receivers and a compensation circuit for increasing the common mode range of the transceiver.
Figure 20C:
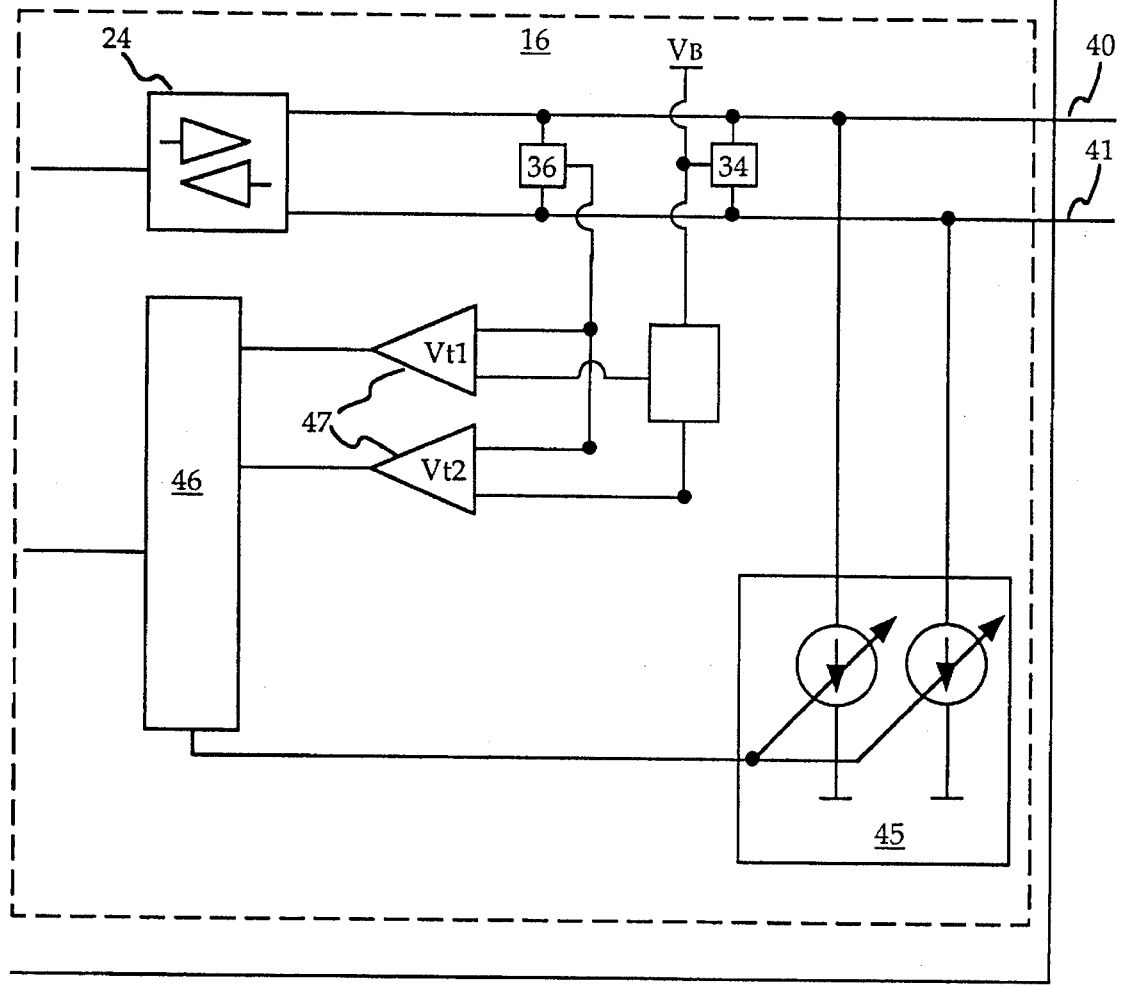
FIG. 20c is a detailed block diagram of the discrete implementation of the second transceiver showing both a plurality of common mode receivers and a compensation circuit for increasing the common mode range of the transceiver.

Second, the reduction in common mode voltage range of the differential transceivers 22,24 due to a decline in the power supply voltage and an increase in the amount of common mode current required for implementation of higher speed settings makes any practical implementation very difficult. One solution to this problem is to add the compensation circuit shown in FIGS. 20b and 20c. FIG. 20b illustrates the continuous implementation. For the continuous implementation, it should contain an error amplifier 47 which directly controls the current compensator 45. The common mode current compensator 45 is capable of producing a common mode current Icm of opposite sign and approximately equal magnitude as the common mode current Icm produced by the common mode transmitter 27 of the first transceiver 14. The control signal from the error amplifier 47 to the current compensator 45 can then be decoded to generate the speed message receiver output. The decoder 46 can be implemented as a set of comparators depending on the number of expecting speed messages. The closed feedback loop formed within the second transceiver 16 by the common mode receiver 47 and the common mode current compensator 45 reduces the amount of common mode voltage seen at the second coupling 36. This reduction is immediately seen by both the first differential transceiver 22 of the first node 21 and the second differential transceiver 24 of the second node 23. FIG. 20c illustrates the discrete implementation. Referring to FIG. 20c, for the discrete implementation, it should contain only two comparators 47 (forming a window comparator) which control the current compensator 45 through a controlling state machine (e.g., registers and gates—an implementation well-known in the art). The state machine then generates the speed message receiver output.

While the present invention has been described in conjunction with the above-embodiments, it is evident that numerous alternatives, depictions, variations and uses will be apparent to those skilled in the art in light of the foregoing description. For example, the speed messaging method of the present invention is not limited to serial buses or to the common mode signaling technique. In addition, the number and specific levels of the different common mode current amplitudes output by the common mode transmitter, and hence, the number of common mode receivers in addition to their specific threshold settings may also be varied.

We claim:

1. A method for transmitting signals on a multi-speed bus coupled to a first node which is adapted to transmit a data message having a message length on said bus at a data transmission rate, said data message being sent to a particular node said bus being coupled to a second node which is adapted to receive data signals from said bus at a data reception rate, the method comprising:

sending a transmission speed signal indicative of said data transmission rate from said first node to said second node;

sending a speed capability signal indicative of said data reception rate from said second node to said first node;

determining whether said data transmission rate exceeds said data reception rate; and if said data transmission rate exceeds said data reception rate, then determining from said message length a data message duration, at said data transmission rate, for the data message and sending a mock data signal from said first node to said second node, wherein said mock data signal is sent at said data reception rate and has a duration equal to said data message duration said data message being sent to said particular node.

2. A method according to claim 1, further comprising sending said data message at said data transmission rate to a third node which is coupled to said bus and adapted to receive data signals at said data transmission rate wherein said particular node is said third node.

3. A method according to claim 1, including a step of receiving said data message from a transmitting node on said bus.

4. A method according to claim 1, including a step of generating said data message at said first node.

5. A method for propagating signals from a first node having at least one port to at least one second node, each of said at least one second node being coupled to a respective said port of said first node by way of a multi-speed point-to-point link, wherein said first node is adapted to transmit data signals at a transmission rate and each of said at least one second node is adapted to receive data at a respective reception rate, said method comprising the steps of:

receiving at said first node a speed capability signal from each of said at least one second node, indicative of the respective reception rate of each second node;

for each second node, determining whether said transmission rate exceeds the respective reception rate for that node;

for each second node for which said transmission rate does not exceed the respective reception rate, sending a data message having a message length to that second node at said transmission rate; and for each second node for which said transmission rate does exceed the respective reception rate, determining a transmission duration for said data message at said transmission rate, and sending a mock message signal to that node at said respective reception rate and for said transmission duration.

6. A method according to claim 5, wherein said first node includes a local host which generates said data message and designates said transmission rate for transmission of said data message from said first node.

7. A method according to claim 5, wherein a third node is coupled to a port of said first node, further including the steps of receiving at said first node a transmission speed message indicative of said transmission rate from said third node, and receiving said data message at said first node from said third node.

8. A node in a data processing system for communicating signals to a second node in the system by way of a bus, comprising:

an input/output port for connection to said second node by way of communication lines forming said bus;

a speed signal transceiver coupled to said input/output port for exchanging speed signals with said second node, including receiving a speed capability signal indicative of a maximum reception rate of said second node, and sending a transmission speed signal indicative of a transmission rate associated with a data message to be transmitted from said node;

a speed control logic circuit coupled to the speed signal transceiver for comparing the maximum reception rate of said second node with the transmission rate associated with said data message; and a first data signal transceiver coupled to said speed control logic circuit and said input/output port for transmitting said data message to said second node at said transmission rate, if said transmission rate does not exceed said maximum reception rate, and otherwise transmitting a mock data message to said second node at a mock signal rate not greater than said maximum reception rate.

9. A node as claimed in claim 8, wherein said speed control logic circuit is adapted to control said first data signal transceiver such that a transmission duration of said mock data message at said mock signal rate is equal to a duration of said data message at said transmission rate.

10. A node as claimed in claim 9, including a second input/output port for connection to a third node by way of respective communication lines, and a second data signal transceiver coupled to said second input/output port and to said first data signal transceiver by way of an internal node bus, to enable said data message to be received from said third node through said second input/output port and passed to said second node by way of said internal node bus and said input/output port.

11. A node as claimed in claim 10, including a local host coupled to said first data signal transceiver for generating said data message and passing said data message to said first data signal transceiver.

12. A node as claimed in claim 8, wherein said input/output port is adapted for passing both differential and common mode signals, and wherein said data signal transceiver is a differential transceiver, and said speed signal transceiver is a common mode transceiver.

13. A nodal network forming a multi-speed bus for transferring data, comprising a plurality of nodes interconnected by way of point-to-point communication links, wherein each node comprises:

first and second communication ports coupled to respective other nodes in the network by way of respective communication links;

a transmission speed receiver means coupled to the first communication port for receiving a speed signal indicative of a data message transmission rate;

a speed capability transmitter coupled to the first communication port for transmitting a first speed capability signal indicative of a first maximum data reception rate for the node;

a data message receiver coupled to the first communication port for receiving a data message at said data message transmission rate if said data message transmission rate does not exceed said first maximum data reception rate;

a transmission speed transmitter coupled to the second communication port for transmitting said speed signal;

a speed capability receiver coupled to the second communication port for receiving a second speed capability signal indicative of a second maximum data reception rate for the respective node coupled to the second communication port; and a data message transmitter coupled to the second communication port for transmitting said data message at said data message transmission rate if said data message transmission rate does not exceed said second maximum data reception rate, and for otherwise transmitting a mock data message at a mock transmission rate not greater than said second maximum data reception rate, such that a transmission duration of said mock data message at said mock transmission rate is equal to a duration of said data message at said transmission rate.

* * * * *